(12) United States Patent
Haseyama

(10) Patent No.: US 9,077,949 B2
(45) Date of Patent: Jul. 7, 2015

(54) CONTENT SEARCH DEVICE AND PROGRAM THAT COMPUTES CORRELATIONS AMONG DIFFERENT FEATURES

(75) Inventor: Miki Haseyama, Sapporo (JP)

(73) Assignee: National University Corporation Hokkaido University, Sapporo-shi (JP)

( * ) Notice: Subject to any disclaimer, the term of this patent is extended or adjusted under 35 U.S.C. 154(b) by 491 days.

(21) Appl. No.: 13/127,355

(22) PCT Filed: Nov. 6, 2009

(86) PCT No.: PCT/JP2009/069005
§ 371 (c)(1),
(2), (4) Date: May 3, 2011

(87) PCT Pub. No.: WO2010/053160
PCT Pub. Date: May 14, 2010

(65) Prior Publication Data
US 2011/0225153 A1   Sep. 15, 2011

Related U.S. Application Data

(60) Provisional application No. 61/193,232, filed on Nov. 7, 2008.

(51) Int. Cl.
*G06F 17/30* (2006.01)
*H04N 5/765* (2006.01)
(Continued)

(52) U.S. Cl.
CPC ............ *H04N 5/765* (2013.01); *G06F 17/3002* (2013.01); *G06F 17/30029* (2013.01);
(Continued)

(58) Field of Classification Search
CPC .................. G06F 17/30017; G06F 17/30038
USPC ........................................................ 707/737
See application file for complete search history.

(56) References Cited

U.S. PATENT DOCUMENTS 6,041,311 A *   3/2000   Chislenko et al. ........... 705/26.7
6,430,307 B1 *  8/2002   Souma et al. ................. 382/118
(Continued)

FOREIGN PATENT DOCUMENTS

JP   2005-010771 A   1/2005
JP   2006-344155 A   12/2006
(Continued)

OTHER PUBLICATIONS

Smith, Lindsay; A tutorial on Principal Components Analysis; Feb. 26, 2002; pp. 1-27.*
(Continued)

*Primary Examiner* — Jacob F Bétit
*Assistant Examiner* — Amanda Willis
(74) *Attorney, Agent, or Firm* — Marvin A. Motsenbocker; Mots Law, PLLC

(57) ABSTRACT

A content search device includes a feature quantity computing unit that computes a feature quantity of at least any one of an image feature, an acoustic feature and a semantic feature included in each piece of content data, and that stores feature quantity data. The device also includes an unknown feature quantity computing unit that computes an unknown feature quantity of each feature type not associated with a content identifier in the feature quantity data by use of the feature quantity of the feature type associated with the content identifier, and that stores the unknown feature quantity as a feature estimated value in the feature quantity data. The device further includes a distance computing unit that computes a distance indicating a similarity between each two pieces of content data based on the feature quantities and the feature estimated values stored in the feature quantity data. The device still further includes a display unit that determines a display position of a thumbnail corresponding to each piece of content data based on the distances computed by the distance computing unit, and that displays the thumbnail on a display device.

21 Claims, 20 Drawing Sheets

|  | IMAGE DATA | MUSIC DATA | MOVING IMAGE DATA |
|---|---|---|---|
| IMAGE FEATURE QUANTITY | PRESENT | ABSENT | PRESENT |
| ACOUSTIC FEATURE QUANTITY | ABSENT | PRESENT | PRESENT |
| SEMANTIC FEATURE QUANTITY | (PRESENT) | (PRESENT) | (PRESENT) |

(51) Int. Cl.

| | |
|---|---|
| *G06K 9/62* | (2006.01) |
| *G10L 25/48* | (2013.01) |
| *G11B 27/10* | (2006.01) |
| *G11B 27/28* | (2006.01) |
| *G11B 27/34* | (2006.01) |
| *H04N 9/82* | (2006.01) |
| *H04N 21/266* | (2011.01) |
| *H04N 21/432* | (2011.01) |
| *H04N 21/439* | (2011.01) |
| *H04N 21/44* | (2011.01) |
| *H04N 21/482* | (2011.01) |
| *H04N 5/91* | (2006.01) |

(52) U.S. Cl.
CPC ........ *G06F17/30038* (2013.01); *G06K 9/6215* (2013.01); *G10H 2210/066* (2013.01); *G10H 2220/005* (2013.01); *G10H 2240/141* (2013.01); *G10L 25/48* (2013.01); *G11B 27/105* (2013.01); *G11B 27/28* (2013.01); *G11B 27/34* (2013.01); *H04N 5/91* (2013.01); *H04N 9/8227* (2013.01); *H04N 21/26603* (2013.01); *H04N 21/4325* (2013.01); *H04N 21/4394* (2013.01); *H04N 21/44008* (2013.01); *H04N 21/4828* (2013.01)

(56) References Cited

U.S. PATENT DOCUMENTS

| | | | | |
|---|---|---|---|---|
| 6,480,841 | B1 * | 11/2002 | Higashio et al. | 1/1 |
| 6,629,097 | B1 * | 9/2003 | Keith | 1/1 |
| 2002/0069218 | A1 * | 6/2002 | Sull et al. | 707/501.1 |
| 2002/0105541 | A1 * | 8/2002 | Endou et al. | 345/738 |
| 2004/0054668 | A1 | 3/2004 | Watanabe et al. | |
| 2004/0267736 | A1 | 12/2004 | Yamane et al. | |
| 2008/0130953 | A1 * | 6/2008 | Ishikawa | 382/103 |

FOREIGN PATENT DOCUMENTS

| | | |
|---|---|---|
| JP | 2007-193222 A | 8/2007 |
| WO | WO02/33589 A1 | 4/2002 |
| WO | WO2007/066450 A | 6/2007 |

OTHER PUBLICATIONS

Hair et al, Multivariate Data Analysis: Canonical Correlation Analysis; 1998, Prentice Hall; 5th edition; pp. 1-29.*

Daigo Michiyama et al., "A note on definition of scene dissimilarities utilizing audio and visual signals for video retrieval", ITE Technical Report, Feb. 21, 2008, vol. 32m No. 9, pp. 55 to 59.

Kazuya Kobayashi et al., "A note on music extraction based on similarity of melody line", ITE Technical Report, Feb. 18, 2008, vol. 32, No. 9, pp. 49 to 53.

Teruhisa Hochin et al., "On the Mutual Multimedia Retrieval Based on Kansei", IPSJ SIG Notes, Jul. 17, 2002, vol. 2002, No. 67, pp. 523 to 528.

Mark A. Bartsch et al., "To Catch a Chorus: Using Chroma-Based Representations for Audio Thumbnailing", pp. 15 to 18.

International searching authority; "Written Opinion of the International Searching Authority"; English translation of PCT/ISA/237 (4 sheets); original version issued Dec. 8, 2009; and cover sheets PCT/IB/338 and PCT/IB/373.

* cited by examiner

FIG. 2

|  | IMAGE DATA | MUSIC DATA | MOVING IMAGE DATA |
|---|---|---|---|
| IMAGE FEATURE QUANTITY | PRESENT | ABSENT | PRESENT |
| ACOUSTIC FEATURE QUANTITY | ABSENT | PRESENT | PRESENT |
| SEMANTIC FEATURE QUANTITY | (PRESENT) | (PRESENT) | (PRESENT) |

FIG. 3

|  | IMAGE DATA | MUSIC DATA | MOVING IMAGE DATA |
|---|---|---|---|
| IMAGE FEATURE QUANTITY | PRESENT | PRESENT | PRESENT |
| ACOUSTIC FEATURE QUANTITY | PRESENT | PRESENT | PRESENT |
| SEMANTIC FEATURE QUANTITY | PRESENT | PRESENT | PRESENT |

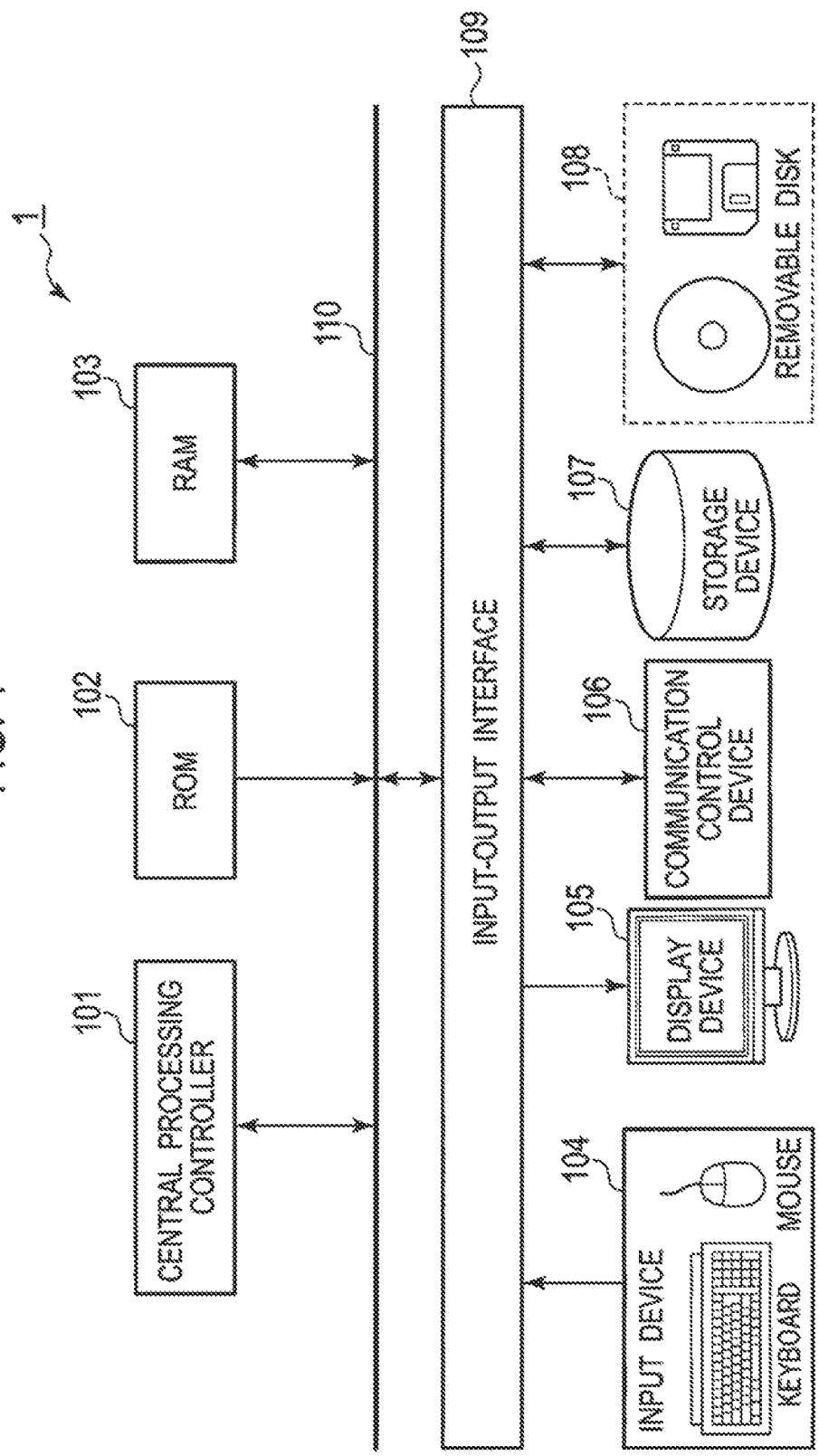

FIG. 5a

| CONTENT IDENTIFIER | CONTENT TYPE | IMAGE FEATURE QUANTITY | ACOUSTIC FEATURE QUANTITY | SEMANTIC FEATURE QUANTITY |
|---|---|---|---|---|
| x x | IMAGE | x x | — | x x |
| x x | MUSIC | — | x x | x x |
| x x | MOVING IMAGE | x x | x x | x x |
| x x | MUSIC | — | x x | x x |
| ... | ... | ... | ... | ... |

| CONTENT IDENTIFIER | CONTENT TYPE | IMAGE FEATURE QUANTITY | ACOUSTIC FEATURE QUANTITY | SEMANTIC FEATURE QUANTITY |
|---|---|---|---|---|
| x x | IMAGE | x x | x x | x x |
| x x | MUSIC | x x | x x | x x |
| x x | MOVING IMAGE | x x | x x | x x |
| x x | MUSIC | x x | x x | x x |
| ... | ... | ... | ... | ... |

34a

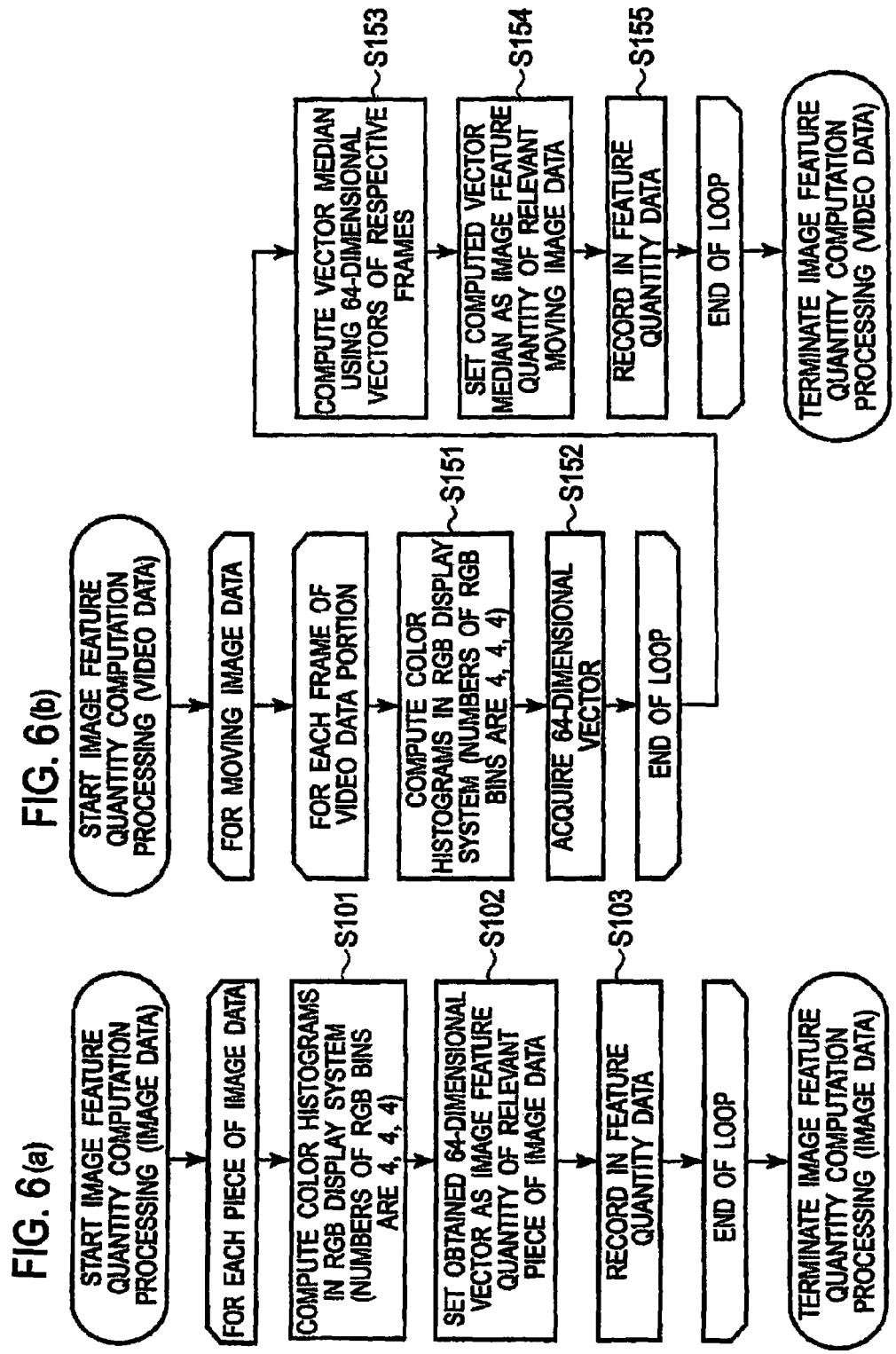

CONTENT SEARCH DEVICE AND PROGRAM THAT COMPUTES CORRELATIONS AMONG DIFFERENT FEATURES

TECHNICAL FIELD

The present invention relates to a content search device and a content search program to search for similar content data.

BACKGROUND ART

Users have become able to acquire a large amount of content data along with recent developments in information communication networks and storage media. Users are able not only to acquire content data created by themselves but also to acquire content data by way of connection to distribution sites and the like. The content data include various types of content data such as image data, moving image data or music data. The image data are data on still images and the like. The moving image data are data on recorded television programs, recoded video programs, movies, animations, and the like. The music data are data on classical music, popular songs, BGM, and the like.

The number of these content data is huge. Accordingly, a user generally utilizes a search system implemented by a computer in order to search for desired content data from a huge number of content data.

In general, devices configured to search for desired contents for each of these types of contents have been disclosed. For instance, there are a search device configured to search for moving image data (see Patent Document 1, for example), a search device configured to search for music data (see Patent Document 2, for example), and other similar devices. Meanwhile, there is also a method of detecting a refrain section of a song (see Non-patent Document 1, for example).

PRIOR ART DOCUMENTS

Patent Documents

Patent Document 1: International Patent Application Publication No. WO2002/033589
Patent Document 2: Japanese Patent Application Publication No. 2005-10771

Non-Patent Document

Non-Patent Document 1: M. A. Bartsch and G. H. Wake_eld, "To catch a chorus: using chroma-based representations for audio thumbnailing," Proc. WAS-PAA'01, pp. 15-18, 2001.

SUMMARY OF THE INVENTION

However, the search system disclosed in Patent Document 1 or Patent Document 2 described above enables search only for one specific type of content data among various types of content data. Therefore, as for the conventional search systems, different search systems corresponding to respective types such as moving images, images, and music need to be used for content search. Moreover, it is not possible to search for similar contents from the content data of different content types such as a moving image and an image, an image and music, or music and a moving image.

Meanwhile, many of conventional search systems search for similar content data by using metadata which is data on a creator, a content outline and the like, and is attached in advance to each piece of the content data. In the case of using such a search system, the metadata needs to be attached to each piece of the content data in advance, which may produce harmful effects for processing a huge number of the content data.

Accordingly, there is an expectation to develop a technique which enables a user to search for desired content data easily without awareness of the content types and even without the metadata.

Hence, it is an object of the present invention to provide a content search device and a content search program which are capable of searching for similar content data from different types of content data.

In order to solve the above problem, a first aspect of the present invention relates to a content search device which searches for similar content data from different types of content data. Specifically, a content search device according to the first aspect of the present invention comprises: a content data storage unit configured to store a plurality of pieces of content data including at least any one of an image feature, an acoustic feature, and a semantic feature in a storage device in association with respective content identifiers; feature quantity computing means for, for each piece of the content data stored in the content data storage unit, computing a feature quantity of at least any one of the image feature, the acoustic feature and the semantic feature included in the piece of the content data, and for storing, in the storage device, feature quantity data in which the content identifier, the feature type among the image feature, the acoustic feature and the semantic feature, and the feature quantity are associated with each other; unknown feature quantity computing means for computing an unknown feature quantity of each feature type not associated with the content identifier by use of the feature quantity of the feature type associated with the content identifier, and for storing the unknown feature quantity as a feature estimated value in the feature quantity data; distance computing means for computing a distance indicating a similarity between each two pieces of the content data based on the feature quantities and the feature estimated values stored in the feature quantity data; and display means for determining a display position of a thumbnail for each piece of the content data based on the distances computed by the distance computing means, and for displaying the thumbnail on a display device.

In this respect, the unknown feature quantity computing means computes the feature estimated value by using a principal component analysis with the feature quantity of the feature type associated with the content identifier in the feature quantity data, for example. In addition, as another example, the unknown feature quantity computing means computes the feature estimated value by using a canonical correlation analysis with the feature quantity of the feature type associated with the content identifier in the feature quantity data.

In computing the feature quantity of the acoustic feature, the characteristic quantity computing means specifies a melody appearing repeatedly in an acoustic signal and defines a feature quantity of the repeated melody as the feature quantity of the acoustic feature.

The content search device according to the first aspect may further comprise: a user preference data storage unit configured to store user preference data in the storage device, the user preference data being data in which an identifier of a user is associated with a content identifier matching preference of the user; and important user determining means for creating a set of the user identifiers associated with the content of each of the content identifiers in the user preference data, for creating a directed edge between the users in each set, and for determining an important user representing each set. In this case, the distance computing means preferably extracts the content identifiers from the user preference data associated with the user identifier of the important user, and computes a distance indicating a similarity between each two pieces of the content data based on the feature quantities and the feature estimated values corresponding to the extracted content identifiers.

The display means may further extract a plurality of user identifiers associated with a certain content from the user preference data, and display a user network on the display device, the user network including nodes as the respective identifiers of the plurality of users, and links between the nodes with consideration given to directed edges between the users.

The second aspect of the present invention relates to a content search program which is used to search for similar content data from different types of content data. Specifically, the content search program according to the second aspect of the present invention is a program causing a computer to comprise: feature quantity computing means for, for each of a plurality of pieces of content data each including at least any one of an image feature, an acoustic feature and a semantic feature and each stored in a storage device in association with a content identifier, computing a feature quantity of at least any one of the image feature, the acoustic feature and the semantic feature included in the piece of the content data, and storing, in the storage device, feature quantity data in which the content identifier, a feature type among the image feature, the acoustic feature and the semantic feature, and the feature quantity are associated with each other; unknown feature quantity computing means for computing an unknown feature quantity of the feature type not associated with the content identifier by use of the feature quantity of the feature type associated with the content identifier, and for storing the unknown feature quantity as a feature estimated value in the feature quantity data; distance computing means for computing a distance indicating a similarity between the respective content data based on the feature quantity and the feature estimated value stored in the feature quantity data; and display means for determining a display position of a thumbnail corresponding to the content data based on the distance computed by the distance computing means, and for displaying the thumbnail on a display device.

In this respect, the unknown feature quantity computing means computes the feature estimated value, by using a principal component analysis, from the feature quantity of the feature type associated with the content identifier in the feature quantity data, for example. In addition, as another example, the unknown feature quantity computing means computes the feature estimated value, by using a canonical correlation analysis, from the feature quantity of the feature type associated with the content identifier in the feature quantity data.

In computing the feature quantity of the acoustic feature, the characteristic quantity computing means may specify a melody appearing repeatedly in an acoustic signal and define a feature quantity of the repeated melody as the feature quantity of the acoustic feature.

The content search program according to the second aspect may further cause the computer to execute: important user determining means for, for user preference data, stored in the storage device, in which an identifier of a user is associated with a content identifier matching preference of the user, creating a set of the user identifiers associated with a piece of the content for each of the content identifiers, for creating a directed edge between the users in each set, and for determining an important user representing each set. In this case, the distance computing means preferably extracts the content identifier from the user preference data associated with the user identifier of the important user, and computes a distance indicating a similarity between the respective content data based on the feature quantity and the feature estimated value corresponding to the extracted content identifier.

The display means may further extract a plurality of user identifiers associated with a certain content from the user preference data, and display a user network on the display device, the user network including nodes respectively representing the identifiers of the plurality of users, and links between the nodes with consideration given to directed edges between the users.

The present invention can provide a content search device and a content search program, which are capable of searching for similar content data from different types of content data.

BRIEF DESCRIPTION OF THE DRAWINGS

FIG. 2 is a view for explaining feature quantities to be computed by the content search device according to the embodiment of the present invention.

FIG. 3 is a view for explaining unknown feature quantities to be computed by the content search device according to the embodiment of the present invention.

FIG. 4 is a view for explaining a hardware configuration of the content search device according to the embodiment of the present invention.

FIG. 5 is a view for explaining a data structure of feature quantity data and an example of data of the content search device according to the embodiment of the present invention.

FIG. 6 is a flowchart for explaining image feature quantity computation processing of the content search device according to the embodiment of the present invention.

MODES FOR CARRYING OUT THE INVENTION

Figure 1:
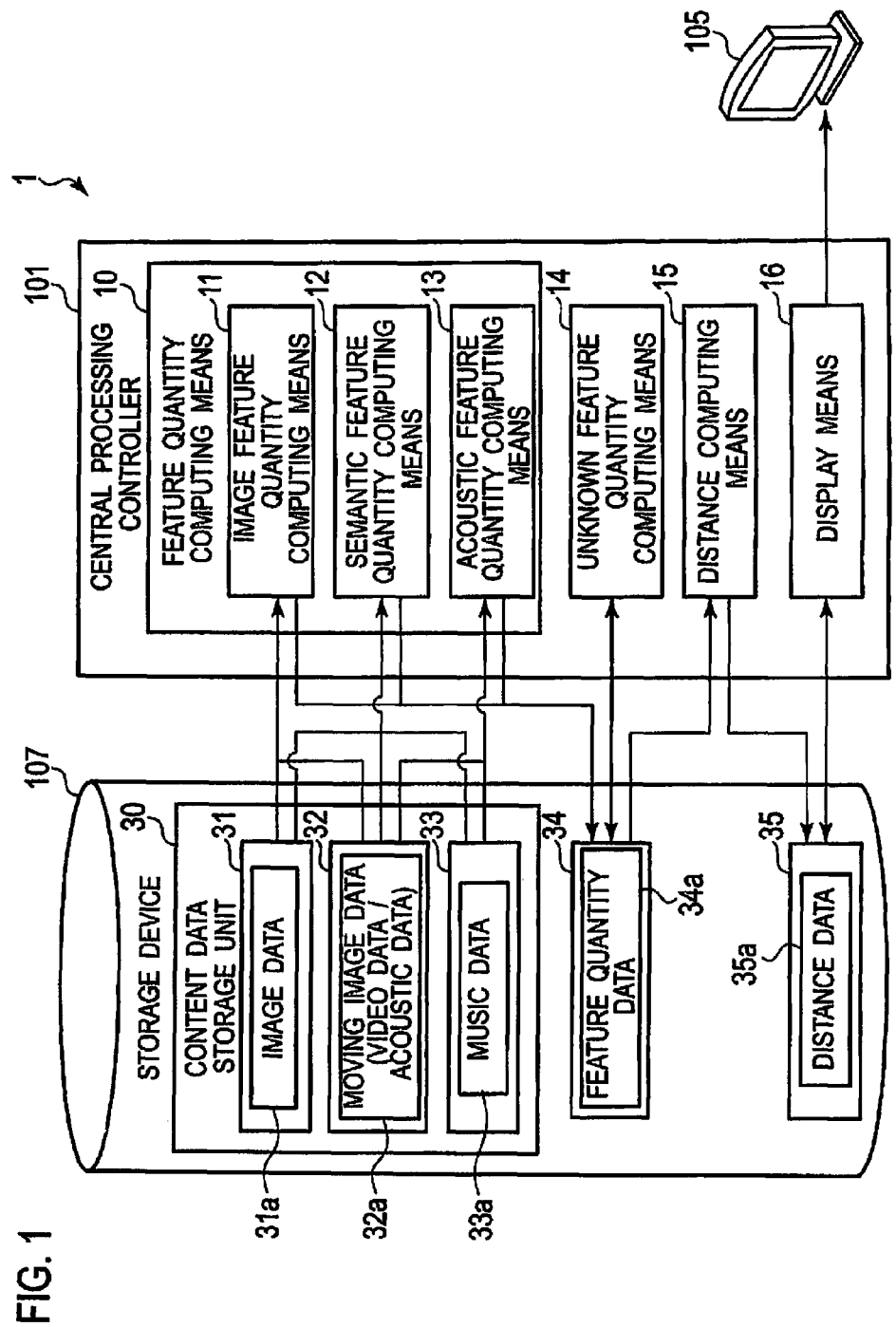
FIG. 1 is a view for explaining functions of a content search device according to an embodiment of the present invention.

Next, an embodiment of the present invention will be described with reference to the accompanying drawings. In the following description of the drawings, identical or similar constituents are designated by identical or similar reference numerals.

Embodiment

As shown in FIG. 1, a content search device 1 according to an embodiment of the present invention searches for similar content data from different types of content data. Specifically, the content search device 1 computes a feature quantity from each piece of content data for various types of content data stored in a content data storage unit 30. In this case, the content search device 1 computes the feature quantities irrespective of whether or not metadata are attached to the various types of content data.

Moreover, the content search device 1 estimates an unknown feature quantity of each piece of content data by use of the computable feature quantity. The content search device 1 computes a distance between each two pieces of the content data by use of the computed feature quantities and the estimated feature quantities, determines the similarity therebetween, and expresses and displays a search result as in a three-dimensional space on a display device 105.

In the embodiment of the present invention, the "content data" represent image data, moving image data, and music data. Moreover, text data may also be included in the content data. Meanwhile, in the embodiment of the present invention, the "feature quantities" represent image feature quantities, semantic feature quantities, and acoustic feature quantities. The image feature quantities are computed based on image data of still images or on color histograms of data of respective frames in moving images. The semantic feature quantities are computed based on frequencies of appearance of terms and the like. The acoustic feature quantities are computed based on time variation of musical scales.

The feature quantities to be computed and the unknown feature quantities to be estimated for the respective content data will be described with reference to FIG. 2 and FIG. 3.

As shown in FIG. 2, since the image data have an image feature, the content search device 1 computes an image feature quantity by use of the image data. Meanwhile, when the metadata are attached to the image data, the content search device 1 also computes a semantic feature quantity by use of the metadata of the image data. Moreover, the content search device 1 computes an acoustic feature quantity as an unknown feature quantity and further computes a semantic feature quantity if metadata are absent. In this way, the image data have all the feature quantities of the image feature quantity, the semantic feature quantity, and the acoustic feature quantity as shown in FIG. 3.

As shown in FIG. 2, since the music data have an acoustic feature, the content search device 1 computes an acoustic feature quantity by use of the music data. Meanwhile, when the metadata are attached to the music data, the content search device 1 also computes a semantic feature quantity by use of the metadata of the music data. Moreover, the content search device 1 computes an image feature quantity as an unknown feature quantity and further computes a semantic feature quantity if metadata are absent. In this way, the music data have all the feature quantities of the image feature quantity, the semantic feature quantity, and the acoustic feature quantity as shown in FIG. 3.

As shown in FIG. 2, since the moving image data have an image feature and an acoustic feature, the content search device 1 computes an image feature quantity and an acoustic feature quantity by use of the moving image data. Meanwhile, when the metadata are attached to the moving image data, the content search device 1 also computes a semantic feature quantity by use of the metadata of the moving image data. Meanwhile, when a human voice, a caption, and the like are included in the moving image data, the content search device 1 also computes a semantic feature quantity of the moving image data by extracting these data as text data. If the semantic feature quantity is not computed, the content search device 1 further computes the semantic feature quantity as the unknown feature quantity. In this way, the moving image data have all the feature quantities of the image feature quantity, the semantic feature quantity, and the acoustic feature quantity as shown in FIG. 3.

As described above, the content search device 1 according to the embodiment of the present invention can compute the image feature quantity, the semantic feature quantity, and the acoustic feature quantity of each of the content data regardless of the type of the content. In addition, the content search device 1 can compute distances between the contents based on the image feature quantities, the semantic feature quantities, and the acoustic feature quantities which are associated with the respective content data and can compute the similarities among the contents. Therefore, it is possible to search for similar contents irrespective of the types of the contents.

The above-described content search device 1 can extract music that matches an image by searching for the music data similar to the image data, for example. Moreover, the content search device 1 can extract a moving image that matches music by searching for the moving image data similar to the music data.

(Hardware Configuration of Content Search Device)

As shown in FIG. 4, in the content search device 1 according to the embodiment of the present invention, a central processing controller 101, a ROM (read only memory) 102, a RAM (random access memory) 103, and an input-output interface 109 are connected to one another via a bus 110. An input device 104, a display device 105, a communication control device 106, a storage device 107, and a removable disk 108 are connected to the input-output interface 109.

The central processing controller 101 reads and executes a boot program for starting the content search device 1 from the ROM 102 based on an input signal from the input device 104, and further reads an operating system stored in the storage device 107. Moreover, the central processing controller 101 is a processing device configured to control the various devices based on input signals to the input device 104, the communication control device 106 and the like, to read programs and data stored in the RAM 103, the storage device 107 and the like, to load the programs and the data into the RAM 103, and to carry out a series of processing to be described later such as data calculation or processing based on commands of the programs read from the RAM 103.

The input device 104 is formed of an input device such as a keyboard or a mouse for an operator to input various operations. The input signals are created based on the operations by the operator and are transmitted to the central processing controller 101 via the input-output interface 109 and the bus 110. The display device 105 is a device such as a CRT (cathode ray tube) display or a liquid crystal display, which is configured to receive an output signal to be displayed on the display device 105 from the central processing controller 101 via the bus 110 and the input-output interface 109 and to display a processing result by the central processing controller 101, for example. The communication control device 106 is a device such as a LAN card or a modem, which is the device configured to connect the content search device 1 to a communication network such as the Internet or a LAN. Data transmitted to and received from the communication network via the communication control device 106 are transmitted to or received from the central processing controller 101 via the input-output interface 109 and the bus 110 as input signals or output signals.

The storage device 107 is a semiconductor storage device or a magnetic disk device, and the programs and data to be executed by the central processing controller 101 are stored therein. The removable disk 108 is equivalent to an optical disk or a flexible disk. Signals read out of and written in by use of a disk drive are transmitted to and received from the central processing controller 101 via the input-output interface 109 and the bus 110.

A content search program is stored in the storage device 107 of the content search device 1 according to the embodiment of the present invention. Moreover, as shown in FIG. 1, the storage device 107 includes a content data storage unit 30, a feature quantity data storage unit 34, and a distance data storage unit 35. Meanwhile, as the content search program is read in and executed by the central processing controller 101 of the content search device 1, feature quantity computing means 10, unknown feature quantity computing means 14, distance computing means 15, and display means 16 are mounted on the content search device 1.

Next, the content search device 1 according to the embodiment of the present invention will be described with reference to FIG. 1.

The storage device 107 includes the content data storage unit 30, the feature quantity data storage unit 34, and the distance data storage unit 35.

The content data storage unit 30 is a storage area where content data are stored. The content data include at least one of an image feature, an acoustic feature, and a semantic feature. In the content data storage unit 30, the respective content data are stored in association with content identifiers. The content data storage unit 30 includes an image data storage unit 31, a moving image data storage unit 32, and a stored music data storage unit 33. A piece of image data 31a is associated with a content identifier and stored in the image data storage unit 31. Multiple pieces of image data may be stored in the image data storage unit 31. A piece of moving image data 32a is associated with a content identifier and stored in the moving image data storage unit 32. Multiple pieces of moving image data may be stored in the moving image data storage unit 32. A piece of music data 33a is associated with a content identifier and stored in a music data storage unit 33. Multiple pieces of music data may be stored in the music data storage unit 33.

Feature quantity data 34a are stored in the feature quantity data storage unit 34. The feature quantity data are data configured to associate the image feature quantities, the acoustic feature quantities, and the semantic feature quantities of the respective content data. The feature quantity data 34a are data in which the respective content identifiers are associated with the image feature quantities, the acoustic feature quantities, and the semantic feature quantities. Each of the feature quantities is either a feature quantity computed by the feature quantity computing means 10 to be described later or a feature quantity computed by the unknown feature quantity computing means 14.

The feature quantity data 34a according to the embodiment of the present invention will be described with reference to FIG. 5. The feature quantity data 34a shown in FIG. 5(a) include respective items of content identifiers, content types, the image feature quantities, the acoustic feature quantities, and the semantic feature quantities. The content identifiers are identifiers associated with the content data respectively stored in the content data storage unit 30. The content types are types of the contents stored in the content data storage unit 30, which have any types of the image, music, and the moving image in the example shown in FIG. 5. The feature quantities of respective features of the content data are associated with the respective items of the image feature quantities, the acoustic feature quantities, and the semantic feature quantities.

When the feature quantities of the respective content data are computed by the feature quantity computing means 10, the feature quantities computed by the feature quantity computing means 10 are stored in the feature quantity data 34a as shown in FIG. 5(a). When the content type is the "image", the image feature is associated as shown in FIG. 5(a). When the content type is the "music", the acoustic feature quantity is associated. When the content type is the moving image, the image feature quantity and the acoustic feature quantity are respectively associated. When the text data can be acquired from the metadata, acoustic data, captured data or the like, the semantic feature quantities may be associated with the respective content identifiers.

Moreover, when the unknown feature quantities of the respective content data are computed by the unknown feature quantity computing means 14, the feature quantities computed by the feature quantity computing means 10 are stored in the feature quantity data 34a as shown in FIG. 5(b). The respective content data are associated with the image feature quantities, the acoustic feature quantities, and the semantic feature quantities. As shown in FIG. 5(b), when the content type is the "image", the acoustic feature quantity is newly associated; whereas, when the content type is the "music", the image feature quantity is newly associated. When any piece of content data is not associated with the semantic feature quantity by the feature quantity computing means 10, the feature quantity computed by the unknown feature quantity computing means 14 is associated therewith.

Distance data 35a are stored in the distance data storage unit 35. The distance data 35a are data in which the content identifiers of any two pieces of the content data among all the content data stored in the content data storage unit 30 are associated with a distance indicating a similarity therebetween in each of the image feature quantity, the semantic feature quantity, and the acoustic feature quantity. For all of the content data stored in the content data storage unit 30, the feature quantity computing means 10 and the unknown feature quantity computing means 14 to be described later compute the image feature quantities, the semantic feature quantities, and the acoustic feature quantities to generate the feature quantity data 34a associated with the content identifiers. Further, the distance computing means 15 extracts the image feature quantities, the semantic feature quantities, and the acoustic feature quantities of any two pieces of the content data from the feature quantity data 34a and computes the distances indicating the similarities between these two pieces of the content data in the image feature, the semantic feature, and the acoustic feature, respectively. The distance computing means 15 generates the distance data 35a by associating the identifiers of these two pieces of the content data with the distance of the image feature, the distance of the semantic feature, and the distance of the acoustic feature.

The feature computing means 10, the unknown feature quantity computing means 14, the distance computing means 15, and the display means 16 are mounted on the central processing controller 101 by installing the content search program.

For each of the content data stored in the content data storage unit 30, the feature quantity computing means 10 computes one or more feature quantities of the image feature, the acoustic feature and the semantic feature possessed by each of the content data, and stores, in the feature quantity data storage unit 34 of the storage device 107, the feature quantity data 34a in which the content identifiers, the feature types of the image feature, the acoustic feature and the semantic feature, and the feature quantities are associated with each other. The feature quantity computing means 10 includes image feature quantity computing means 11, semantic feature quantity computing means 12, and acoustic feature quantity computing means 13.

The image feature quantity computing means 11 computes a color histogram as the image feature quantity for the image data 31a stored in the image data storage unit 31. Moreover, the image feature quantity computing means 11 computes the respective color histograms from all frames for video data of the moving image data 32a stored in the moving image data storage unit 32, and defines a vector median thereof as the image feature quantity.

With reference to FIG. 6(a), description will be given of processing by the image feature quantity computing means 11 according to the embodiment of the present invention to compute the image feature quantity for the image data 31a. Processing from step S101 to step S103 is repeated for each of the image data.

Specifically, the image feature quantity computing means 11 computes the color histograms according to an RGB display system for the image data corresponding to one content identifier in step S101. The numbers of respective RGB bins in this case are defined as 4, 4, and 4, for example. Next, in step S102, the image feature quantity computing means 11 outputs a vector obtained in step S101 as the image feature quantity of the image data. This vector is 64-dimensional when the numbers of the RGB bins are defined as 4, 4, and 4 in step S101. In step S103, the image feature quantity computing means 11 records the image feature quantity outputted in step S102 in the feature quantity data 34a as the image feature quantity corresponding to the content identifier of the image data.

With reference to FIG. 6(b), description will be given of processing by the image feature quantity computing means 11 according to the embodiment of the present invention to compute the image feature quantity for the moving image data 32a. The processing from step S151 to step S155 is repeated for each video data of the moving image data.

Specifically, the image feature quantity computing means 11 extracts a video data component in one piece of the moving image data corresponding to a content identifier, and counts a 64-dimensional vector for each frame in step S151. First, in step S151, the image feature quantity computing means 11 computes the color histograms according to the RGB display system for the image data corresponding to one frame. The numbers of respective RGB bins in this case are defined as 4, 4, and 4, for example. Next, in step S152, the image feature quantity computing means 11 outputs a vector obtained in step S151 as the feature quantity of the frame. This vector to be acquired in step S152 is 64-dimensional when the numbers of the RGB bins are defined as 4, 4, and 4 in step S151.

When the 64-dimensional vectors for the respective frames in a video data component in one piece of the moving image data are acquired, a vector median is computed by use of the 64-dimensional vectors of the respective frames in step S153, and outputs the vector median as the image feature quantity of the video data in step S154. In step S155, the image feature quantity computing means 11 records the image feature quantity outputted in step S154 in the feature quantity data 34a as the image feature quantity corresponding to the content identifier of the moving image data.

The semantic feature quantity computing means 12 computes the semantic feature quantities. When the metadata in a text format are attached to the image data 31a, the moving image data 32a and the music data 33a, the semantic feature quantity computing means 12 computes the semantic feature quantities from these metadata. Moreover, when human voices or captured data are included in the moving image data 32a, the semantic feature quantity computing means 12 may also compute the semantic feature quantities by converting these data into the text format. Meanwhile, when singing voices are included in the music data 33a, lyrics data may be acquired by converting the data of these singing voices into the text format and the semantic feature quantities may be computed.

Figure 7:
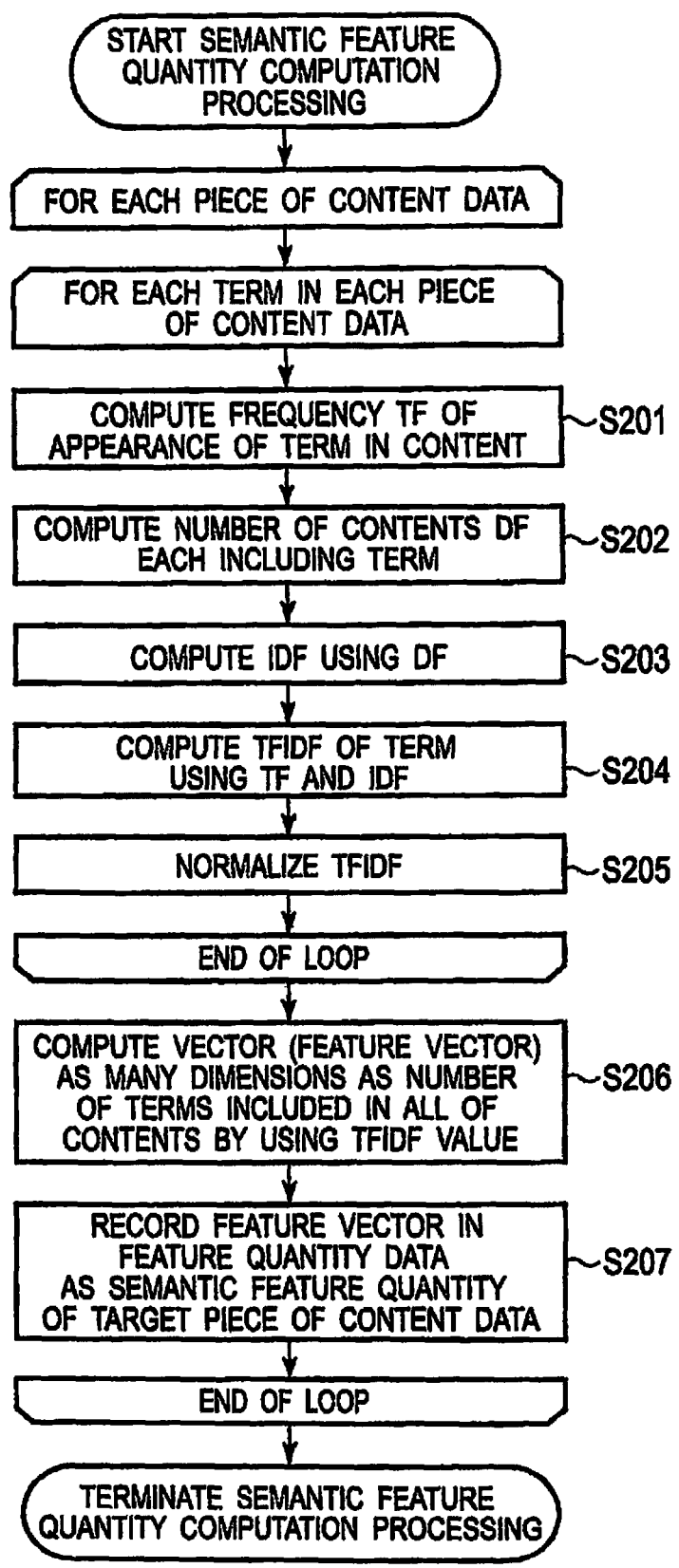
FIG. 7 is a flowchart for explaining semantic feature quantity computation processing of the content search device according to the embodiment of the present invention.

With reference to FIG. 7, description will be given of processing by the semantic feature quantity computing means 12 according to the embodiment of the present invention to compute the semantic feature quantity for each piece of the content data. The processing from step S201 to step S208 is repeated for text data of the respective content data.

First, the semantic feature quantity computing means 12 repeats processing from step S201 to step S205 for each of terms included in the text data of the respective content data and thereby acquires TFIDF. The TFIDF is computed for a characteristic term in the text and based on two indices of TF (term frequency) and an IDF (inverse document frequency).

In step S201, the semantic feature quantity computing means 12 computes the number of times TF of appearance of each term in the contents. Next, in step S202, the semantic feature quantity computing means 12 computes the number of contents DF of appearance of each term in the contents. In step S203, the IDF is computed by using the DF which is computed in step S202. In step S204, the semantic feature quantity computing means 12 computes the TFIDF of each term by using the TF computed in step S201 and the IDF computed in step S203. In step S205, the semantic feature quantity computing means 12 normalizes the TFIDF computed in step S204.

When the TFIDF is normalized for each term included in the given contents, the semantic feature quantity computing means 12 computes a feature vector in step S206. The feature vector is a vector having the number of terms included in all of the contents for the number of dimensions. In step S207, the semantic feature quantity computing means 12 records the feature vector computed in step S206 in the feature quantity data 34a as the semantic feature quantity corresponding to the content identifier of the content data.

The acoustic feature quantity computing means 13 computes the acoustic feature quantities for the music data 33a stored in the music data storage unit 33. Further, the acoustic feature quantity computing means 13 computes the acoustic feature quantities for acoustic data of the moving image data 32a stored in the moving image data storage unit 32.

Figure 8:
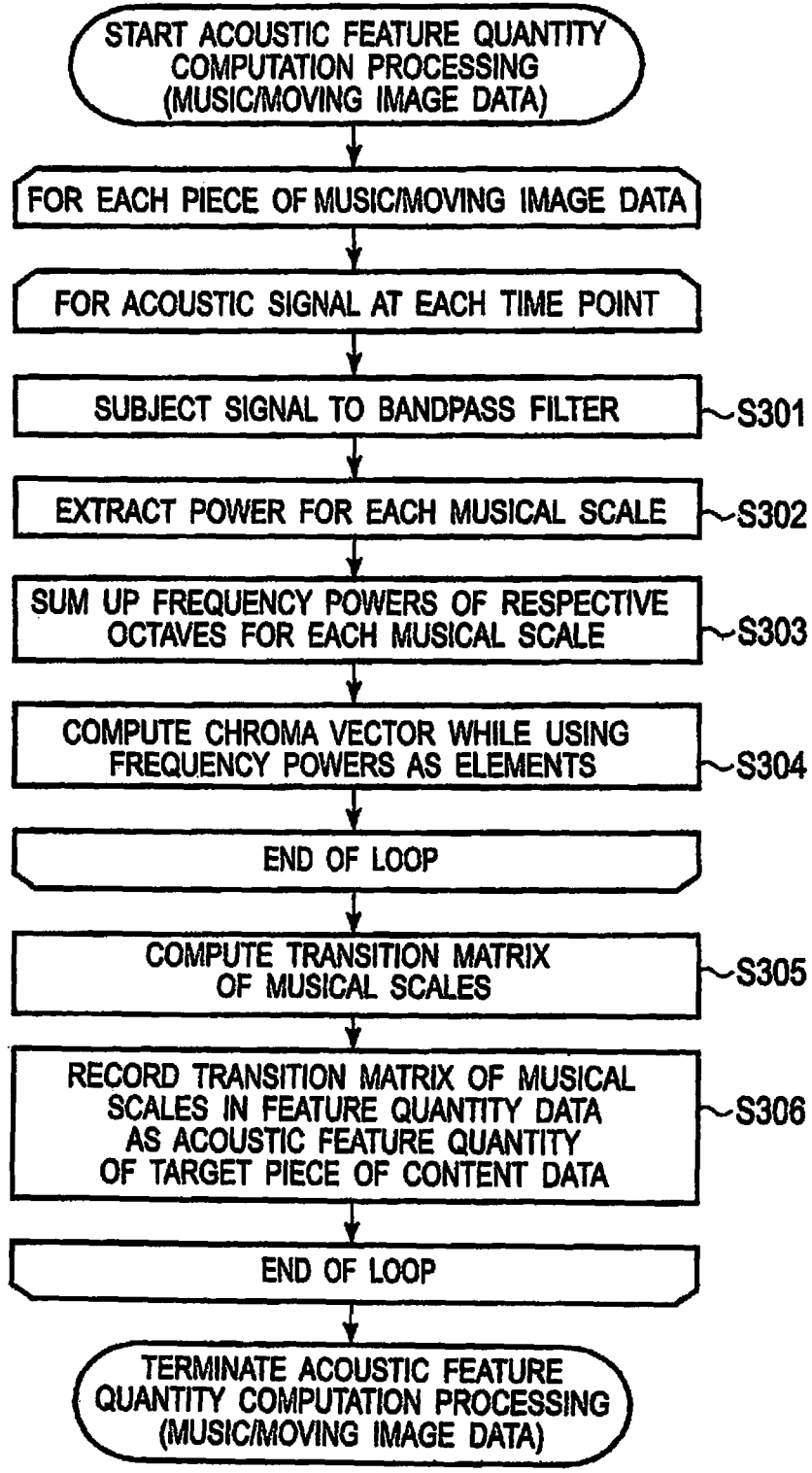
FIG. 8 is a flowchart for explaining acoustic feature quantity computation processing of the content search device according to the embodiment of the present invention.

With reference to FIG. 8, description will be given of processing by the acoustic feature quantity computing means 13 according to the embodiment of the present invention to compute the image feature quantities for the acoustic data of the music data 33a and the moving image data 32a. The processing from step S301 to step S306 is repeated for an acoustic signal of each music data or acoustic data.

The acoustic feature quantity computing means 13 computes a chroma vector for an acoustic signal at each time point from step S301 to step S304. Specifically, the acoustic feature quantity computing means 13 subjects the acoustic signal at a certain time point to a bandpass filter in step S301, and extracts a power for each of musical scales in step S302. In this way, power distribution of the musical scales can be obtained in each time point. The acoustic feature quantity computing means 13 sums up frequency powers of respective octaves for each of the musical scales extracted in step S302 in step S303, and computes the chroma vector with the summed frequency powers as elements in step S304.

When the chroma vectors are computed for the acoustic signals at respective time points of certain music data or acoustic data, the acoustic feature quantity computing means computes a transition matrix of the musical scales representing time variation of the chroma vectors by using the chroma vectors of the respective time points in step S305. In this case, the acoustic feature quantity computing means 13 computes the transition matrix so as to minimize a mean square error in the case of estimating a chroma vector at a certain time point from a chroma vector at one unit time period prior to the certain time point. In step S306, the acoustic feature quantity computing means 13 records, in the feature quantity data 34a, the elements of transition matrix of a musical scale computed in step S305 as the acoustic feature quantity corresponding to the content identifier of the content data.

For the feature quantity data 34a, the unknown feature quantity computing means 14 computes unknown feature quantities for the individual feature types which are not associated with the content identifiers by using feature quantities for the individual feature types which are associated with the content identifiers, and stores the unknown feature quantities as feature estimated values in the feature quantity data 34a.

For example, the image feature quantities are computed for the image data 31a by the image feature computing means 11 as shown in FIG. 2. However, the acoustic feature quantities are not computed because the image data 31a do not include any acoustic signals. Meanwhile, when the metadata are not attached to the image data 31a, no semantic feature quantities are computed. Accordingly, the unknown feature quantity computing means 14 computes the acoustic feature quantity and the semantic feature quantity for the image data 31a as shown in FIG. 3.

For the moving image data 32a, the image feature quantities are computed by the image feature quantity computing means 11 and the acoustic feature quantities are computed by the acoustic feature quantity computing means 13. When the metadata are not attached to the moving image data 32a or when a human voice, a caption or the like is not included therein, no semantic feature quantities are computed. Accordingly, the unknown feature quantity computing means 14 computes the semantic feature quantity for the moving image data 32a as shown in FIG. 3.

For the music data 33a, the acoustic feature quantity is computed by the acoustic feature quantity computing means 13. However, the image feature quantities are not computed because the music data 33a do not include any image signals. In addition, when the metadata are not attached to the music data 33a, no semantic feature quantities are computed. Accordingly, the unknown feature quantity computing means 14 computes the image feature quantity and the semantic feature quantity for the music data 33a as shown in FIG. 3.

It is necessary to find correlations among different features in order to compute the unknown feature quantities. Conceivable methods of computing the unknown quantities include a method according to a principal component analysis, a method according to a canonical correlation analysis, and the like.

While the canonical correlation analysis is the most suitable method for finding the correlations among the different features, the principal component analysis finds correlations among the same features as well. In the meantime, since the correlations among all the features are found in the principal component analysis, there are no restraints as to which features are known or unknown. Therefore, the principal component analysis can reduce a calculation amount.

On the other hand, the method according to the canonical correlation analysis can compute optimum correlations when the known data and the unknown data are clarified.

It is preferable that the unknown feature quantity computing means 14 select any of the computation methods depending on data situations, a required processing capability, and the like.

Figure 9:
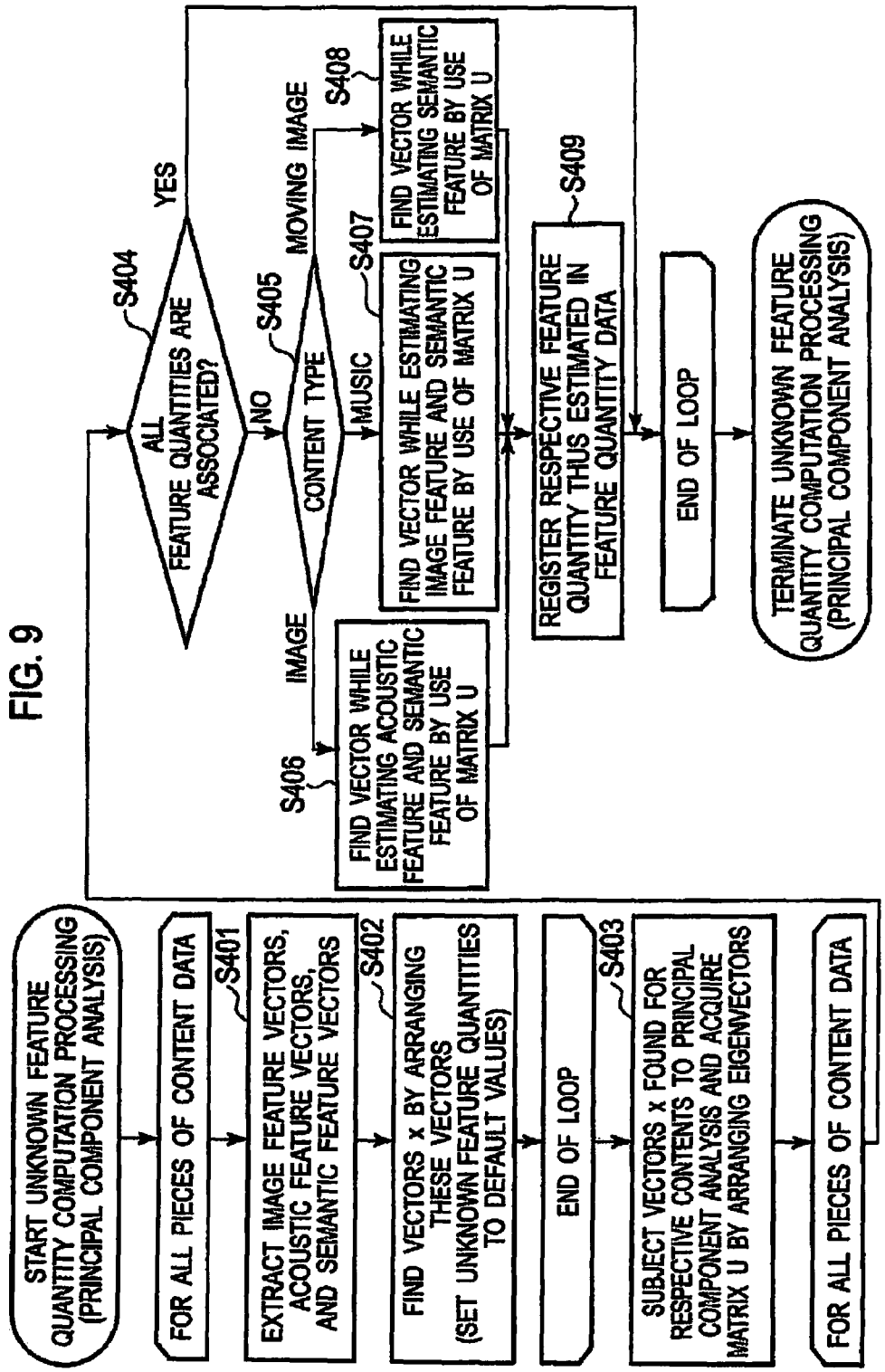
FIG. 9 is a flowchart for explaining unknown feature quantity computation processing by way of a principal component analysis by the content search device according to the embodiment of the present invention.

With reference to FIG. 9, description will be given of processing by the unknown feature quantity computing means 14 according to the principal component analysis to compute the unknown feature quantity. The unknown feature quantity computing means 14 subjects the respective feature quantities obtained by the feature quantity computing means 10 to the principal component analysis and obtains eigenspaces thereof. The unknown feature quantity computing means 14 can compute the unknown feature quantities in the respective content data by using the eigenspaces thus obtained.

First, in step S401 and step S402, the unknown feature quantity computing means 14 computes a vector x of the feature values of each piece of the content data. Specifically, in step S401, the unknown feature quantity computing means 14 extracts, from the feature quantity data 34a, an image feature vector (the image feature quantity), an acoustic feature vector (the acoustic feature quantity), and a semantic feature vector (the semantic feature quantity) for a certain piece of the content data. In step S402, the unknown feature quantity computing means 14 finds the vector x by arranging the respective vectors extracted in step S401. In this case, a default value is set up for the unknown feature quantity such as the acoustic feature quantity of the image data.

When the vectors x are computed for all pieces of the content data, the unknown feature quantity computing means 14 subjects the vectors x of the respective the contents to the principal component analysis and acquires a matrix U by arranging eigenvectors in step S403.

In step S404 to step S409, the unknown feature quantity computing means 14 computes the feature values for the individual feature types which are not associated with the feature values for the respective the content data. Specifically, in step S404, the unknown feature quantity computing means 14 judges whether or not all the feature quantities are associated with the vector x of a certain piece of the content data. This is the case where the content data are the moving image data which are associated with the metadata and include human voices or captions, for example. When the content data are associated with all the feature quantities, the unknown feature quantity computing means 14 performs the processing of step S404 for the next piece of the content data.

On the other hand, when the content data are not associated with any of the feature quantities, the unknown feature quantity computing means 14 directs processing depending on the content types in step S405. When the content data are the image data, the unknown feature quantity computing means 14 computes in step S406 a vector estimating the acoustic feature of the content data by utilizing the matrix U acquired in step S403. If the semantic feature quantity is not associated with the content data, the unknown feature quantity computing means 14 further computes a vector estimating the semantic feature of the content data.

When the content data are the music data, the unknown feature quantity computing means 14 computes in step S407 a vector estimating the image feature of the content data by utilizing the matrix U acquired in step S403. If the semantic feature quantity is not associated with the content data, the unknown feature quantity computing means 14 further computes a vector estimating the semantic feature of the content data.

When content data are the moving image data, the unknown feature quantity computing means 14 computes in step S408 a vector estimating the semantic feature of the content data by utilizing the matrix U acquired in step S403.

When the unknown feature quantities are computed by use of the matrix U from step S406 to step S408, the computed feature quantities are associated with the identifiers of the content data and registered in the feature quantity data 34a in step S409.

The unknown feature quantity computation processing is completed when step S404 to step S409 are executed for all pieces of the content data.

Figure 10:
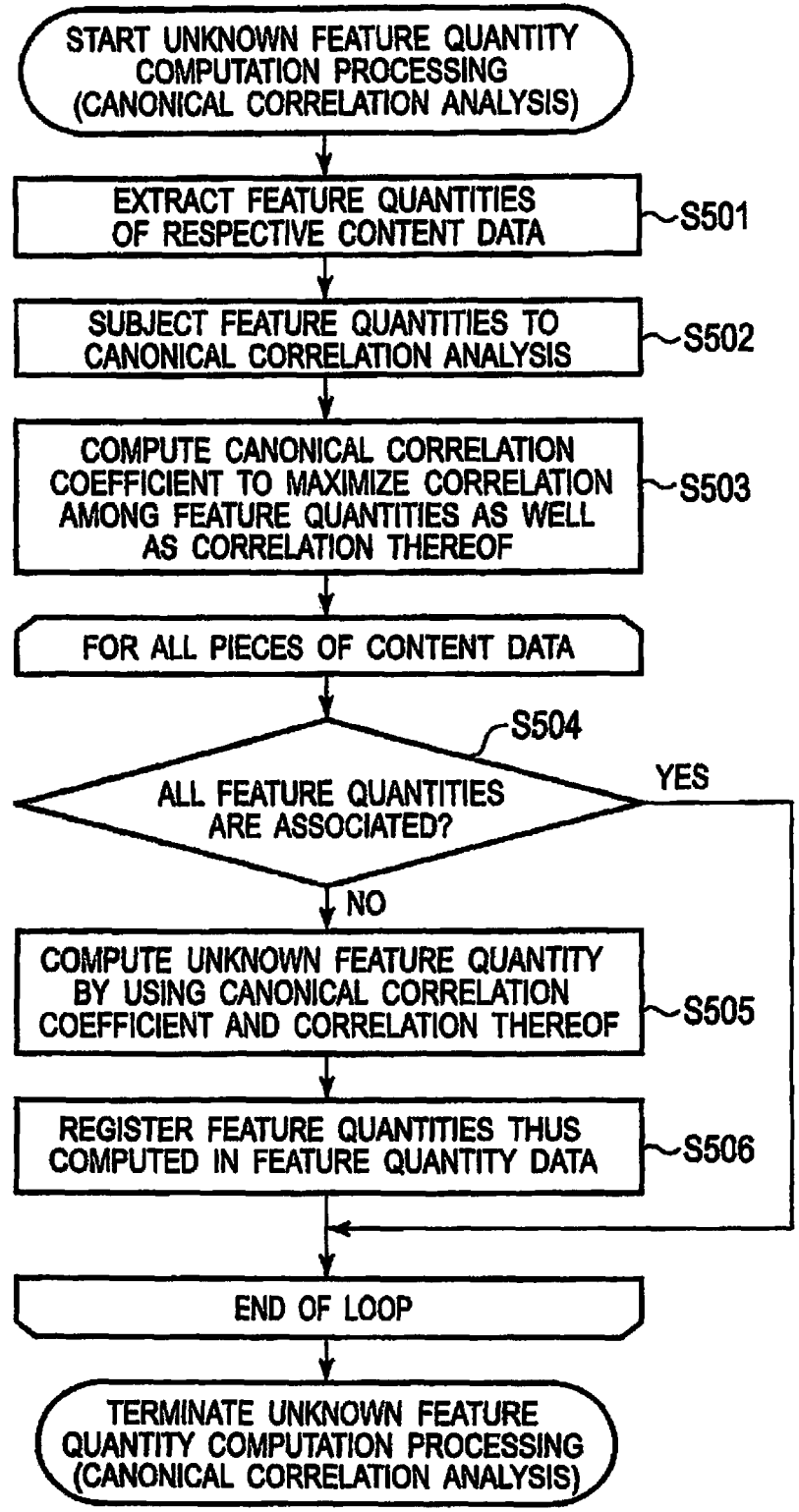
FIG. 10 is a flowchart for explaining unknown feature quantity computation processing by way of a canonical correlation analysis by the content search device according to the embodiment of the present invention.

With reference to FIG. 10, description will be given of processing by the unknown feature quantity computing means 14 according to the canonical correlation analysis to compute the unknown feature quantity. The unknown feature quantity computing means 14 subjects the respective feature quantities obtained by the feature quantity computing means 10 to the canonical correlation analysis and obtains a canonical correlation coefficient to maximize a correlation among the feature quantities as well as the correlation.

First, in step S501, the unknown feature quantity computing means 14 reads out the feature quantity data 34a and extracts the feature quantities of the respective content data. In step S502, the unknown feature quantity computing means 14 subjects the feature quantities extracted in step S501 to the canonical correlation analysis. In step S503, the unknown feature quantity computing means 14 computes a canonical correlation coefficient to maximize a correlation among the feature quantities as well as the correlation.

In step S504 to step S506 the unknown feature quantity computing means 14 computes the feature values for the individual feature types which are not associated with the feature values for the respective the content data. Specifically, in step S604, the unknown feature quantity computing means 14 judges whether or not all the feature quantities are associated with the vector x of a certain piece of the content data. This is the case where the content data are the moving image data and either when the metadata are associated with the moving image data or when human voices or captions are included in the moving image data, for example. When the content data are associated with all the feature quantities, the unknown feature quantity computing means 14 performs the processing of step S504 for the next piece of the content data.

On the other hand, when the content data are not associated with any of the feature quantities, the unknown feature quantity computing means 14 computes the unknown feature quantity by use of the canonical correlation coefficient and the correlation computed in step S503. In step S506, the unknown feature quantity computing means 14 registers the feature quantities computed in step S505 in the feature quantity data 34a with the feature quantities associated with the identifiers of the content data.

The unknown feature quantity computation processing is completed when step S504 to step S506 are executed for all pieces of the content data.

The distance computing means 15 computes the distances indicating the similarities among the respective content data based on the feature quantities and the feature estimated values stored in the feature quantity data 34a. The distance is smaller as the respective content data are more similar to one another while the distance is larger as the respective content data are less similar to one another. The computed distances are stored in the feature quantity data storage unit 34.

In the embodiment of the present invention, the content search device 1 can associate the image feature quantities, the semantic feature quantities and the semantic feature quantities with all pieces of the content data regardless of the content types. Therefore, it is possible to compute the similarity between the different contents such as the similarity between the image data and the music data or the similarity between the moving image data and the music data.

Therefore, a user can search for similar contents from the different content types of contents without designating a specific content type.

By linking the contents having high similarities, it is possible to extract "the music that matches the image", "the music that matches the moving image", and the like. Accordingly, while the conventional technique can link only the known contents, the embodiment of the present invention can produce new contents by linking contents unknown to an operator and can support an idea to produce a content.

Moreover, in the embodiment of the present invention, the distances are computed respectively for the image feature, the semantic feature, and the acoustic feature. Therefore, the distance computing means 15 can also search for similar contents with a focus placed on one feature such as "the music data similar to the video data (the image feature) of the moving image data" or "the image data similar to the semantic feature of the moving image data".

Figure 11:
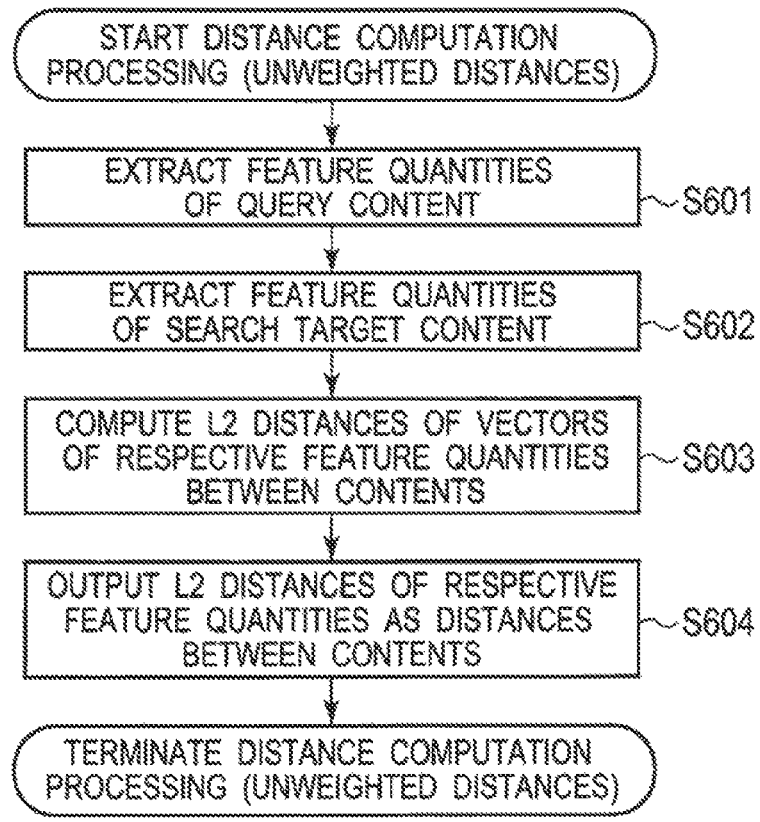
FIG. 11 is a flowchart showing distance computation processing for computing an unweighted distance by the content search device according to the embodiment of the present invention.
Figure 12:
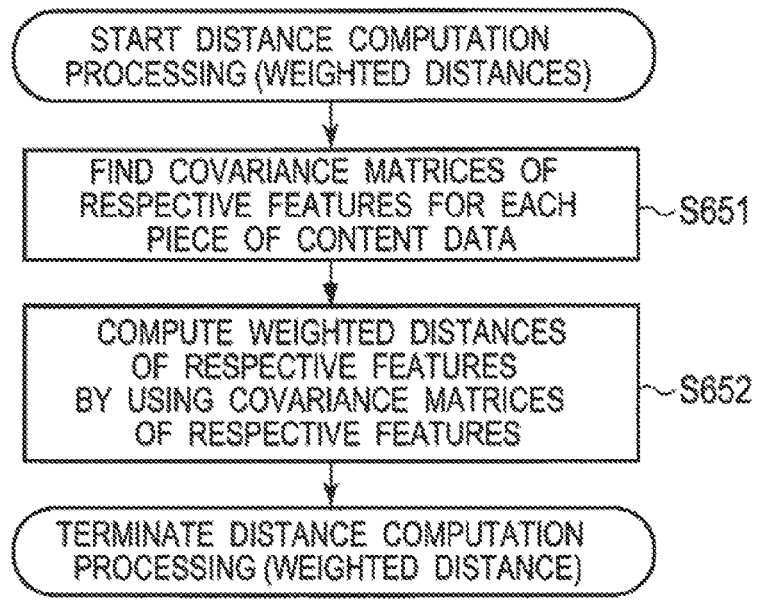
FIG. 12 is a flowchart showing distance computation processing for computing a weighted distance by the content search device according to the embodiment of the present invention.

In the best embodiment of the present invention, the distance computing means 15 computes any of an unweighted distance and a weighted distance for each of the features. With reference to FIG. 11 and FIG. 12, description will be given of processing by the distance computing means 15 to compute the distance.

With reference to FIG. 11, description will be given of processing to compute the unweighted distance. FIG. 11 describes a case of computing a distance between certain query content data stored in the content data storage unit 31 and other search target content data. In the example shown in FIG. 11, a L2 distance of the feature quantity is outputted as the distance between the contents.

From the feature quantity data 34, the distance computing means 15 extracts the feature quantities associated with the content identifier of the query content data in step S601, and extracts the feature quantities associated with the content identifier of the search target content data in step S602. The feature quantities extracted in step S601 and step S602 are the image feature quantities, the semantic feature quantities, and the acoustic feature quantities which are computed by the feature quantity computing means 10 and the unknown feature quantity computing means 14.

In step S603, the distance computing means 15 computes the L2 distances of vectors of the respective feature quantities extracted in step S601 and step S602 as the distance between the query content and the search target content. The distance computing means 15 computes the unweighted distance of the image feature, the unweighted distance of the semantic feature, and the unweighted distance of the acoustic feature. In step S604, the L2 distances of the respective features computed in step S603 are outputted as the distances between the contents.

Further, the distance computing means 15 repeats the processing from step S601 to step S604 for other search target contents and outputs the respective distances of the image features, the semantic features, and the acoustic features for the query content and the respective search target contents.

With reference to FIG. 12, description will be given of processing to compute the weighted distance. In the example shown in FIG. 12, a Mahalanobis' generalized distance to be computed by use of a covariance matrix is outputted as the distance between the contents.

First, in step S651, the distance computing means 15 finds the covariance matrix of the image features, the semantic features, and the acoustic features for the respective content data. In step S652, the distance computing means 15 computes the weighted distance of the features based on the Mahalanobis' generalized distance by using the covariance matrix of the features computed in step S651.

The distance between the contents computed by the distance computing means 15 is used for computation of positions where the respective contents are displayed by the display means 16.

When the query content is provided, the display means 16 displays a search for the content similar to the query content and a result thereof. The display means 16 determines display positions of thumbnails corresponding to the respective content data based on the distances computed by the distance computing means 15, and displays the thumbnails on the display device 105. The display means 16 displays the query content in the center of a screen, for example. Moreover, the display means 16 displays the similar content having the small distance close to the query content and displays the non-similar content having the large distance away from the query content.

The display means 16 determines the display positions based on the distances between the contents by using a multidimensional scaling (MDS) and display the contents on the display device 105. The "multidimensional scaling" is one method of a multivariate analysis. The "multidimensional scaling" expresses relations among classification objects by means of positional relations of points in a low dimensional space. In the embodiment of the present invention, a search result retaining similarity relations among the contents is visualized by means of application to the distances among the feature vectors computed for the respective contents.

Further, the display means 16 is a user interface configured to replay the respective contents of the image data, the video data, and the music data. The display means 16 realizes replay of the video data, replay of the image data, replay of the music data, and the like.

The replay of the image data by the display means 16 will be described. The display means 16 lays out the thumbnail of the image data 31a in the image data storage unit 31 in an arbitrary position on a display screen of the display device 105 and replays the image data 31a. In this case, the display means 16 generates a decoration to be illuminated in a color contained in the image data 31a so that the decoration conforms to a horizontal and vertical size of the image data 31a. The display means 16 lays out and displays this decoration around the image data 31a. By providing the decoration around the image data 31a as described above, a visual effect to clarify a difference in the content type from the moving image data 32a is obtained when a display is made on the screen at the same time as the moving image data 32a.

The replay of the video data by the display means 16 will be described. The display means 16 lays out the thumbnail of the moving image data 32a in the moving image data storage unit 32 in an arbitrary position on a display screen of the display device 105 and replays the moving image data 32a. In this case, the display means 16 displays a current frame of the moving image data 32a being replayed and displays an image of a frame after the currently replayed frame while arranging the frame behind the frame being replayed in a three-dimensional space. The display means 16 constantly updates the image of the currently replayed frame and the image of the frame to be displayed thereafter along with the replay of the moving image data 32*a*. In this way, it is possible to obtain a visual effect as if the image is flowing from the back to the front during the replay of the moving image data 32*a*.

The replay of the music data by the display means 16 will be described. The display means 16 lays out the thumbnail of the music data 33*a* in the music data storage unit 33 in an arbitrary position on a display screen of the display device 105 and replays the music data 33*a*. In this case, the display means 16 performs animation such as rotation of the thumbnail in a position where the thumbnail of the music data 33*a* is laid out, for example. Hence it is possible to obtain a visual effect to show that the music data 33*a* is being replayed. The display means 16 subjects a signal length of the music data 33*a* and the music data 33*a* to Fourier transform, generates animation data based on a result thereof, and displays the animation data on the display device 105.

When the query content is provided, a case where the display means 16 displays a search result of the content similar to the query content will be described. In the embodiment of the present invention, when a search instruction is inputted by the user during the replay of the content data such as the moving image data, the display means 16 of the content search device 1 searches for the similar content from the content data storage unit 30 while defining the content data being replayed as the query content data, and displays the search result on the display device 105.

To search for the content, the content data having small distances from the query content data are extracted from various types of content data stored in the content data storage unit 30 based on the distances among the contents computed by the distance computing means 15. To be more precise, the display means 16 extracts the content identifier having the small distance from the query content data from the distance data 35*a*, and output the content data corresponding to the extracted content identifier as the similar content data. Here, the distance data 35*a* includes the distances computed respectively for the image feature, the semantic feature, and the acoustic feature. Accordingly, it is also possible to output the similar content data by setting weights to respective parameters of the image feature, the semantic feature, and the acoustic feature. In this way, the display means 16 can search for the similar content with a focus placed only on the image feature. Meanwhile, the display means 16 can search for the similar content data by setting the weights so as to define the acoustic feature as 3 and to define the semantic feature as 7.

After searching for the similar content data, the display means 16 displays the thumbnail of the content data on the display device 105 based on the positional relation computed in accordance with multidimensional scaling. A two-dimensional space is displayed on the display screen of the display device 105 while the display position of the thumbnail of the query content data is defined as a point of origin. The display means 16 provides coordinates computed by using multidimensional scaling to respective search results and thereby determines the display positions and the sizes of the respective search results. Moreover, when the thumbnail of the content data is selected by the user, the display means 16 can search for the similar content to the content data of the selected thumbnail defined as the query content data.

Figure 13:
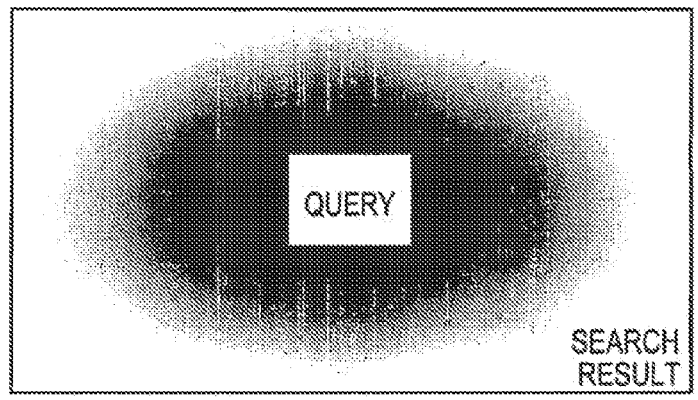
FIG. 13 is a view for explaining a screen structure of the content search device according to the embodiment of the present invention configured to display a thumbnail of query content data in the center of a screen and to display thumbnails of content data representing a search result in a surrounding area thereof.
Figure 14:
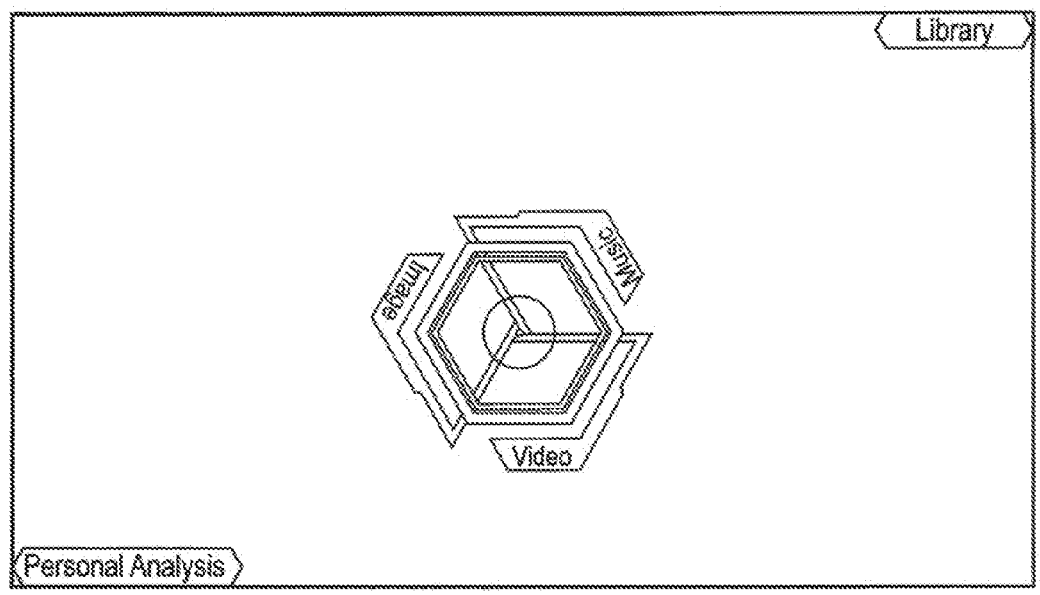
FIG. 14 is a view for explaining an example of a screen of the content search device according to the embodiment of the present invention for designating the query content data.
Figure 15:
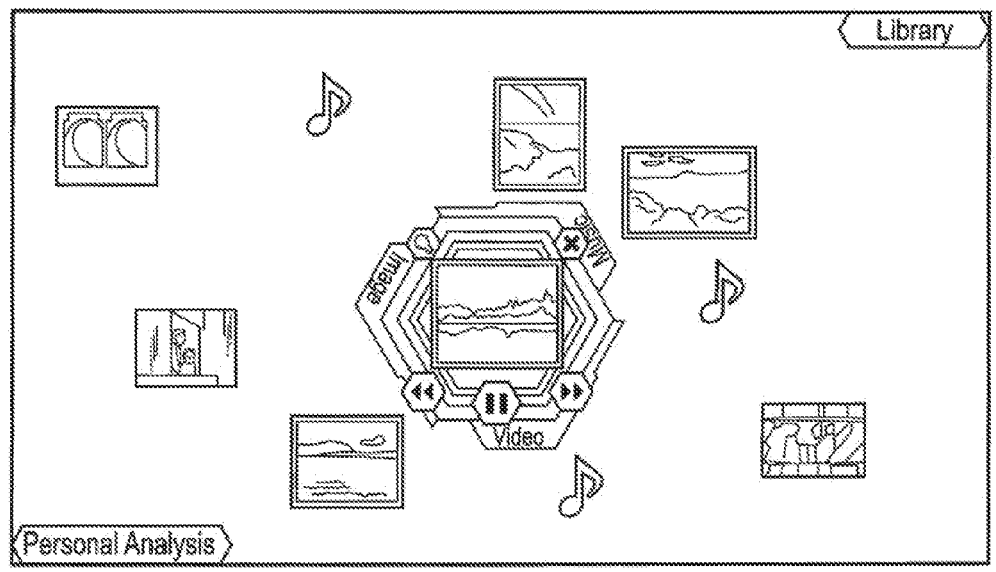
FIG. 15 is a view for explaining an example of a screen of the content search device according to the embodiment of the present invention configured to display a thumbnail of query content data in the center of a screen and to display thumbnails of content data representing a search result in a surrounding area thereof.
Figure 16:
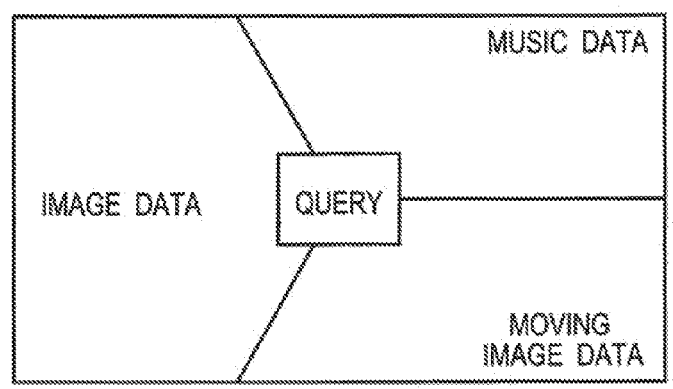
FIG. 16 is a view for explaining a screen structure of the content search device according to the embodiment of the present invention, which is configured to display separate display areas depending on the types of the content data.
Figure 17:
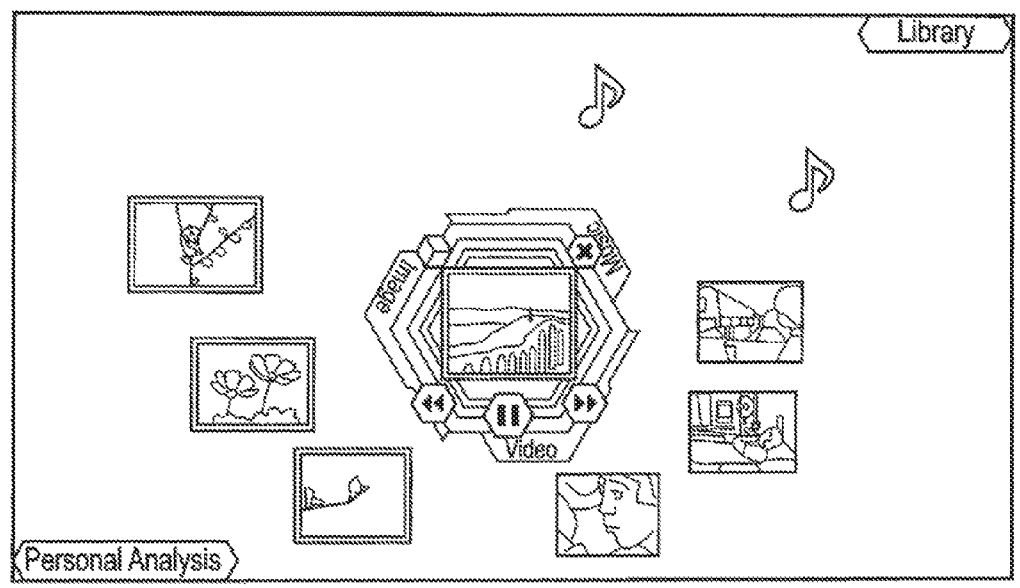
FIG. 17 is a view for explaining an example of a screen of the content search device according to the embodiment of the present invention, which is configured to display the separate display areas depending on the types of the content data.
Figure 18:
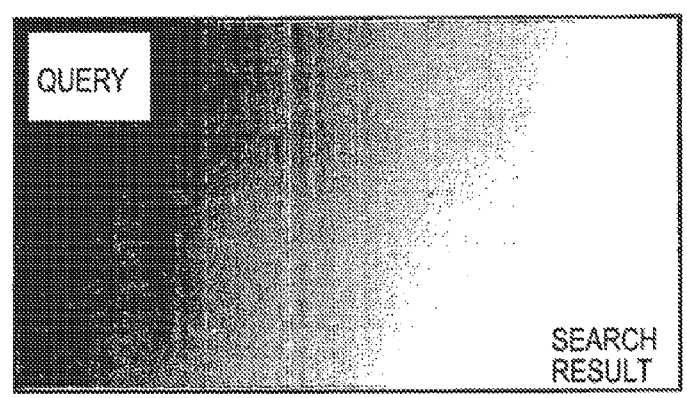
FIG. 18 is a view for explaining a screen structure of the content search device according to the embodiment of the present invention, which is configured to display a thumbnail of query content data on the upper left of a screen and to display thumbnails of content data of a search result radially from the thumbnail of the query content data.

When the display means 16 displays the query content data and the content data similar to the query content data, display patterns as shown in FIG. 13, FIG. 16, and FIG. 18 are conceivable. Concrete examples displayed in the display patterns of FIG. 13, FIG. 16, and FIG. 18 are shown in FIG. 14, FIG. 15, FIG. 17, and FIG. 19 to FIG. 21, respectively. In FIG. 15, FIG. 17, and FIG. 19 to FIG. 21, thumbnails of images surrounded by double lines are thumbnails of the image data. Meanwhile, thumbnails of images surrounded by single lines are thumbnails of the moving image data. The moving image data may be replayed in these thumbnails of the moving image data. Meanwhile, thumbnails showing images of musical notes are thumbnails of the music data. During a period of replaying the music data, the thumbnail of the music data executes animation such as rotation indicating that the data are being replayed.

In the example shown in FIG. 13, the thumbnail of the query content data is displayed in the center of the screen while the thumbnails of the content data of the search result around the thumbnails. The more similar content data are located closer to the thumbnail of the query content data. In the example shown in FIG. 13, the thumbnails of the content data of the search result are displayed irrespective of the content types of the image data, the moving image data, the music data, and the like.

In this case, when the search instruction is inputted by the user during the replay of the content data such as the moving image data 32*a*, the coordinates of the thumbnails of the content data of the search result are recomputed based on the coordinates in the two-dimensional space computed by using multidimensional scaling while the thumbnail of the query content data is arranged in the center. Thus, the thumbnails are arranged on the display screen of the display device 105. In the example shown in FIG. 13, the user can visually grasp degrees of similarities between the query content data and the searched content data as well as similarities between the searched content data by way of the positional relations of the multiple contents displayed thereon.

The screen example of displaying the thumbnails in accordance with the example shown in FIG. 13 will be described with reference to FIG. 14 and FIG. 15. First, FIG. 14 is a screen to be displayed in the first place by the content search device 1 according to the embodiment of the present invention. A frame for designating the query content data is provided in the center in FIG. 14. When the query content data are set in this frame by the user, the content search device 1 according to the embodiment of the present invention searches for the content data similar to the query content data from the various types of content data stored in the content data storage unit 30, and displays the result as shown on the screen in FIG. 15. In FIG. 15, the thumbnail of the query content is displayed in the center. Meanwhile, the thumbnails of the similar content data are displayed around the thumbnails of the query content data, and more similar data are displayed closer to each other.

The example shown in FIG. 16 is similar to the example shown in FIG. 13 in that the thumbnail of the query content data is displayed in the center of the screen while the thumbnails of the content data of the search result are displayed around that thumbnail. Although the thumbnails of the content data of the research result are displayed irrespective of the content types in the example shown in FIG. 13, the example shown in FIG. 16 is different in that display areas are divided depending on the types of the content data. In the example shown in FIG. 16, among the thumbnails of the content data of the search result, the thumbnails of the image data are displayed on the left of the screen, the thumbnails of the music data are displayed on the upper right of the screen, and the thumbnails of the moving image data are displayed on the lower right of the screen.

In this case, when the search instruction is inputted by the user during the replay of the content data such as the moving image data 32a, the display means 16 computes the coordinates in the two-dimensional space by use of multidimensional scaling while the thumbnail of the query content data is arranged in the center. Moreover, the display means 16 recomputes the coordinates of the thumbnails of the content data of the search result depending on the content types thereof based on the coordinates in the two-dimensional space thus computed, and arranges the thumbnails on the display screen of the display device 105. In the example shown in FIG. 16, the user can visually grasp the types of the searched contents, the degrees of similarities between the query content data and the searched content data, and the similarities between the searched content data by way of the areas and the positional relations of the multiple contents displayed thereon.

The screen example of displaying the thumbnails in accordance with the example shown in FIG. 16 will be described with reference to FIG. 17. In the example shown in FIG. 17, the thumbnail of the query content data is displayed in the center. Meanwhile, the thumbnails of the image data are displayed on the left of the thumbnail of the query content data, the thumbnails of the music data are displayed on the upper right of the thumbnail of the query content data, and the thumbnails of the moving image data are displayed on the lower right of the thumbnail of the query content data.

The example shown in FIG. 18, the thumbnail of the query content data is displayed on the upper left of the screen while the thumbnails of the content data of the search result are displayed radially from the thumbnail of the query content data. In the example shown in FIG. 18, the thumbnail of the content data of the search result is displayed for the same kind of content data as the query content data such as the image data, moving image data and music data.

In this case, when the search instruction is inputted by the user during the replay of the content data such as the moving image data 32a, the display means 16 arranges the query at the end of the screen, and recomputes the coordinates of the thumbnail of the content data of the search result on the basis of the two-dimensional space computed by using multidimensional scaling while the thumbnail of the query content data is arranged in the center. The search result displayed in the arrangement for focusing on one of media allows visually grasping the degrees of similarities between the query content data and the search result by way of the positional relations of the displayed contents. In the example shown in FIG. 18, the search result is displayed with a focus placed on any one of media of the image data, the moving image data, and the acoustic data. In this case, it is not necessary to recompute the coordinates for the thumbnails of the content types on which no focus is placed.

Figure 19:
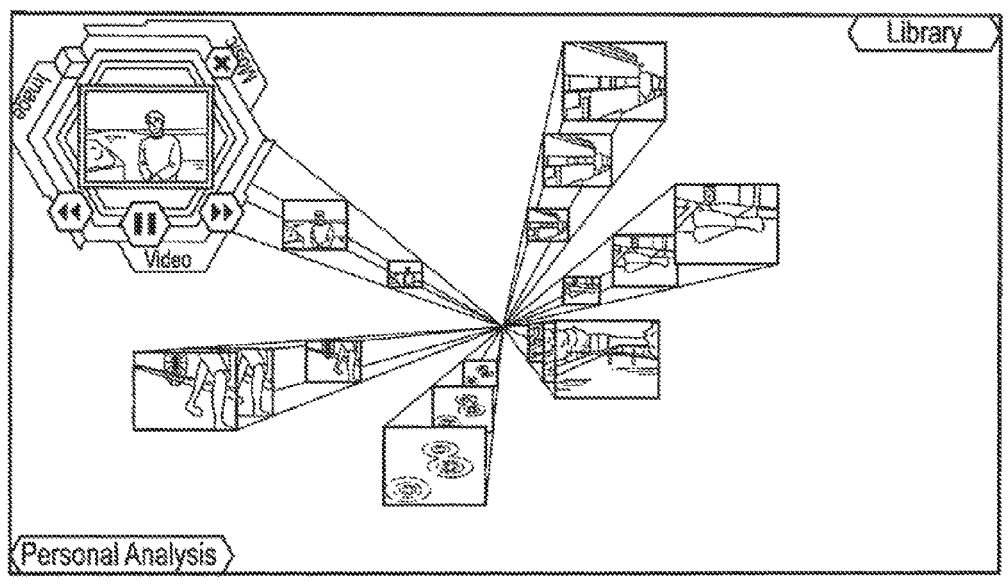
FIG. 19 is a view for explaining an example of a screen of the content search device according to the embodiment of the present invention, which is configured to display the thumbnail of the query content data on the upper left of the screen and to display radially from the thumbnail of the query content data with a focus placed on one of moving image data of a search result.
Figure 20:
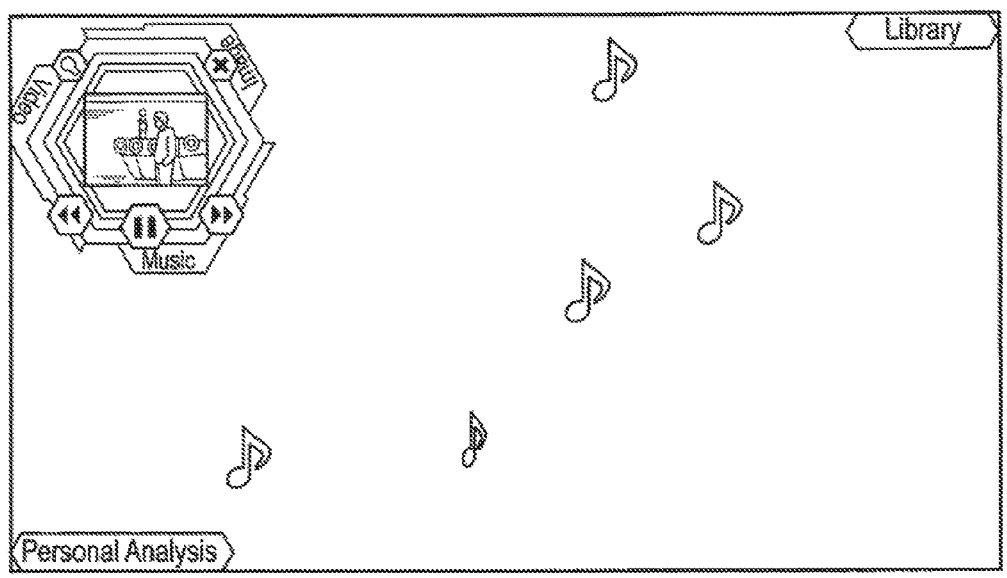
FIG. 20 is a view for explaining an example of a screen of the content search device according to the embodiment of the present invention, which is configured to display the thumbnail of the query content data on the upper left of the screen and to display radially from the thumbnail of the query content data with a focus placed on one of music data of a search result.
Figure 21:
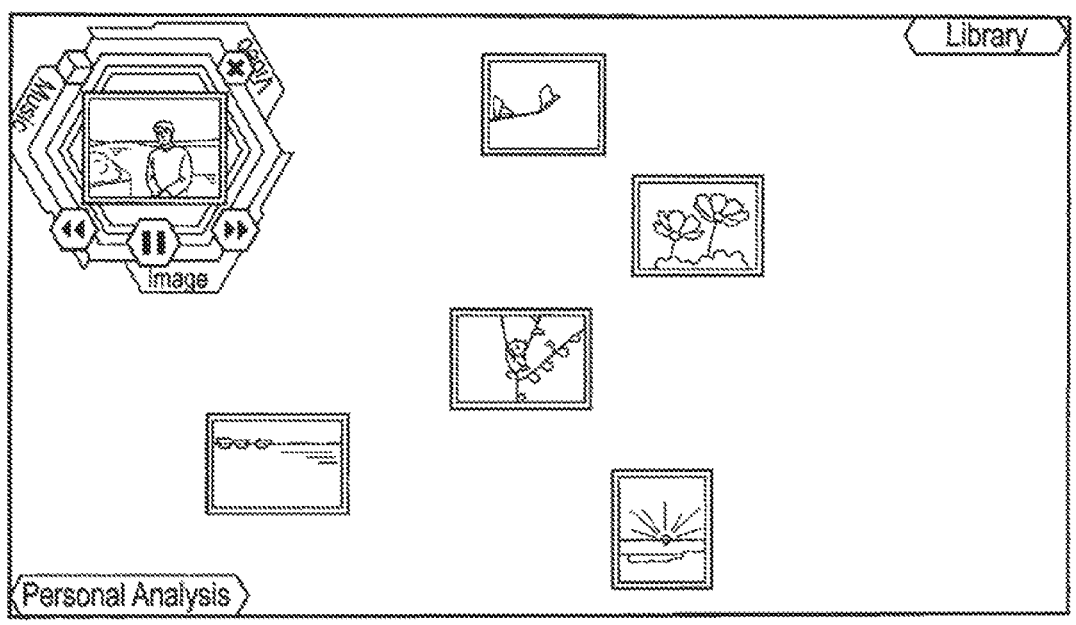
FIG. 21 is a view for explaining an example of a screen of the content search device according to the embodiment of the present invention, which is configured to display the thumbnail of the query content data on the upper left of the screen and to display radially from the thumbnail of the query content data with a focus placed on one of image data of a search result.

The screen example of displaying the thumbnails in accordance with the example shown in FIG. 18 will be described with reference to FIG. 19 to FIG. 21. The screen examples shown from FIG. 19 to FIG. 21 are the screen examples displaying the search result with a focus placed on the content type of the selected thumbnail when any one of the thumbnails shown in FIG. 15 or FIG. 17 is selected. Here, the term "focusing" means to search for and display any of the "moving image", "sound", and "image" content types in particular. An unfocused case means to search for and display all of the "moving image", "sound", and "image" content types.

In FIG. 19, the thumbnail of the moving image data similar to query moving image data is displayed with a focus placed on the moving image data. The respective thumbnails replay the moving images. Moreover, multiple images of the frames to be replayed later are three-dimensionally displayed from the center of the screen toward the respective thumbnails. In FIG. 20, the thumbnail of the music data similar to the query content data is displayed with a focus placed on the music data. In FIG. 21, the thumbnail of the image data similar to the moving image data is displayed with a focus placed on the image data.

(Effects)

As described above, according to the content search device 1 of the embodiment of the present invention, the image feature quantities, the semantic feature quantities, and the acoustic feature quantities are computed for the various types of contents. Therefore, the content search device 1 can search for the similar content data between the image data and the music data, between the moving image data and the image data, between the moving image data and the music data, and so forth irrespective of the content types.

Further, the display means 16 can also display the searched content data depending on the content types. Meanwhile, it is also possible to focus on the certain content, to define the content as the query content data, and to search for the similar content to that content.

Here, text data including only characters and sounds may also be used as the content data. The semantic feature quantity computing means 12 of the feature quantity computing means 10 can compute the semantic feature quantities by using the text data. Further, the unknown feature quantity computing means 14 can compute the image feature quantities and the acoustic feature quantities. Accordingly, it is possible to compute the image feature quantities, the semantic feature quantities, and the acoustic feature quantities for the text data as well. Hence the distance computing means 15 can also compute the distances between text data and the music data, between the text data and the image data, and between the text data and the moving image data. Therefore, for the text data as well, it is possible to search for the similar content data irrespective of the content types.

Detailed algorithms of the respective processing means will be described below.

(Algorithm of Feature Quantity Computation Processing)

An algorithm of the feature quantity computation processing by the feature quantity computing means 10 will be described below. In the embodiment of the present invention, the color histogram is used as the image feature quantity of the image data 31a and the video data of the moving image data 32a. The TFIDF is used as the semantic quantity of the image data 31a, the moving image data 32a and the music data 33a. A feature quantity based on transition of musical scales is used as the acoustic feature quantity of the acoustic data of the moving image data 32a and the music data 33a.

First, an algorithm of image feature quantity computation by the image feature quantity computing means 11 will be described. In the embodiment of the present invention, the image feature quantity computing means 11 obtains HSV color histograms from a still image $f^{still}$ and uses a vector $v^{still}$ formed by sequentially arranging elements thereof as the feature vector of the still image $f^{still}$. In this case, the obtained feature vector is p-dimensional. Meanwhile, the value thereof is equivalent to a product of the number of bins of hue, chroma, and brightness histograms. Moreover, the image feature quantity computing means 11 finds the HSV color histograms for respective frames of a moving image signal $f^{video}$ and computes a vector by sequentially arranging elements thereof. Further, the image feature quantity computing means 11 obtains a vector median from the entire feature vectors of all of the frames and defines the vector median as an image feature vector $V^{video}$.

Next, an algorithm of semantic feature quantity computation by the semantic feature quantity computing means 12 will be described. In the embodiment of the present invention, the semantic feature quantity computing means 12 computes TF-IDF for a text included in the content of the moving image signal $f^{video}$ by the following processing. A TF-IDF method is a method to compute a degree to characterize a certain content for each of terms appearing in the content. In the TF-IDF method, the characteristic degree of the term is computed in accordance with the following formula.

$$TFIDF(t_i, C_j) = TF(t_i, C_j)IDF(t_i) \quad \text{[Formula 1]}$$

$$IDF(t_i) = \log\frac{N}{DF(t_i)}$$

$t_i$: target term of computing of TFIDF($t_i$,$C_j$). i is a subscript indicating the term identification
$C_j$: the content including term $t_i$. j(j=1, 2, ..., $N_c$; $N_c$ is number of contents) is a subscript indicating the content identifier.
N: the total number of contents.
TF($t_i$,$C_j$): stands for Term Frequency. Frequency of appearance of term $t_i$.
DF($t_i$): stands for Document Frequency. Number of contents including at least one term $t_i$.
IDF($t_i$): stands for Inverse Document Frequency. Reciprocal of ratio DF($t_i$) the total number of contents.

A value of TFIDF ($t_i$, $C_j$) to be computed in accordance with the foregoing formula becomes greater as TF ($t_i$, $C_j$) is greater and DF ($t_i$) is smaller. That is, the value of TFIDF ($t_i$, $C_j$) becomes greater when the term $t_i$ appears frequently in the content $C_j$ and does not appear frequently in other contents. Here, the TFIDF tends to become larger when there are a large total number of terms in the content. Accordingly, it is desirable to use normalized values when comparing the TFIDF values between the contents. Therefore, the semantic feature quantity computing means 12 normalizes the value of TFIDF in accordance with the following formula.

$$w(t_i, C_j) = \frac{TFIDF(t_i, C_j)}{\sqrt{\sum_{c=1}^{T}(TFIDF(t_c, C_j))^2}} \quad \text{[Formula 2]}$$

T: the number of term kinds included in all contents.

In the best embodiment of the present invention, the semantic feature quantity computing means 12 obtains a text feature vector of the content $C_j$, $$wC_j = (w(t_1, C_j), w(t_2, C_j), \ldots, w(t_T, C_j)) \quad \text{[Formula 3]}$$

by applying the TFIDF method to the moving image signal $f^{video}$. Here, as feature amount other than the TF-IDF method, it is possible to assume that $$\tilde{w}(t_i, C_j) = 1 \quad \text{[Formula 4]}$$

when each content $C_j$ has the text $t_i$, or to assume that $$\tilde{w}(t_i, C_j) = 0 \quad \text{[Formula 5]}$$

when each content $C_j$ does not have the text $t_i$, and to utilize a feature quantity defined by $$w(t_i, C_j) = \frac{\tilde{w}(t_i, C_j)}{\sqrt{\sum_{c=1}^{T}\tilde{w}(t_c, C_j)^2}} \quad \text{[Formula 6]}$$

Further, an algorithm of acoustic feature quantity computation by the acoustic feature quantity computing means 13 will be described. In the embodiment of the present invention, the acoustic feature quantity computing means 13 computes an index to represent a melody with a focus placed on transition of musical scales in a song. In the embodiment of the present invention, a feature quantity based on transition of musical scales is computed by use of an acoustic signal $f^{music}$ and an acoustic signal included in the moving image signal $f^{video}$. As preprocessing, short-time Fourier transform (STFT) using a window function h (t) which is a Hanning window is calculated by fast Fourier transform (FFT). The entire song is processed by shifting FFT frames in a time axis direction. In the embodiment of the present invention, the acoustic feature quantity computing means 13 computes chroma vectors from all processing target sections. Moreover, the acoustic feature quantity computing means 13 computes a transition matrix of musical scales as the index to represent the melody by using the obtained chroma vectors.

Computation of the chroma vector and computation of the transition matrix of musical scales will be described below.

Figure 22:
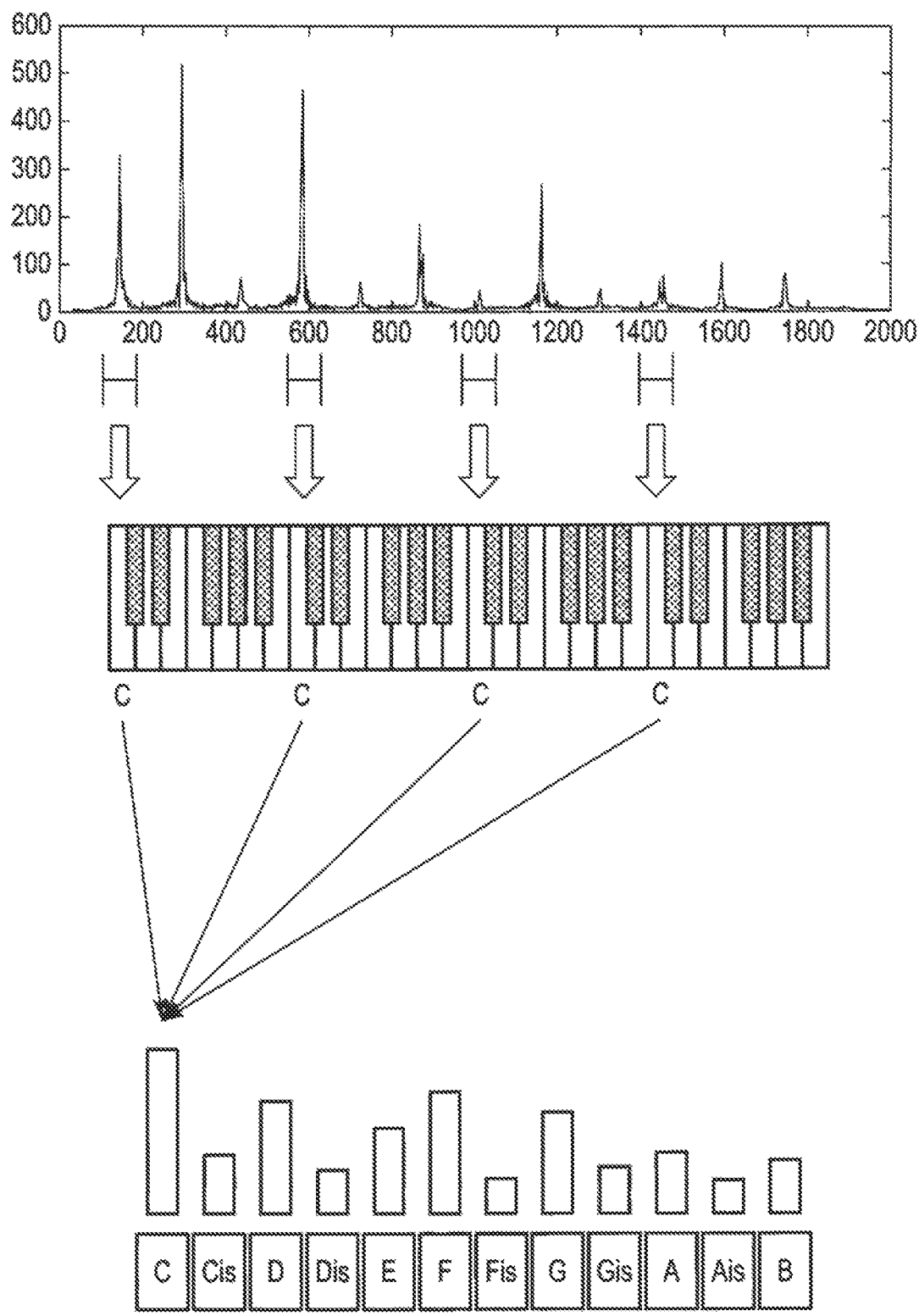
FIG. 22 is a view for explaining an outline of chroma vector computation by the content search device according to the embodiment of the present invention.

First, computation of the chroma vector will be described. Since musical notes are generally formed of twelve tones, the chroma vector is expressed in twelve dimensions on the assumption that the respective dimensions of the vector represent power of different musical scales of equal temperament in the embodiment of the present invention. FIG. 22 shows an outline of computation of the chroma vector. The acoustic feature quantity computing means 13 computes the STFT for an inputted song signal at time t and then converts a frequency axis into a frequency g on a logarithmic scale, thereby finding a power spectrum $\Psi_P$ (g, t). The frequency on the logarithmic scale is expressed on a cent basis and a frequency $g_{Hz}$ expressed by Hz is converted into a frequency $g_{cent}$ expressed by the cent as follows.

$$g_{cent} = 1200\log_2\frac{g_{Hz}}{440 \times 2^{\frac{3}{12}-5}} \quad \text{[Formula 7]}$$

A half tone in the equal temperament corresponds to 100 cent while one octave corresponds to 1200 cent. Accordingly, the frequency of a pitch name c (c is an integer satisfying 1≤c≤12 which corresponds to any of the musical scale C, $C_{is}$, ..., B) in an octave position h, namely, $$G_{c,h}\text{cent} \quad \text{[Formula 8]}$$

can be expressed by $$G_{c,h} = 1200h + 100(c-1) \quad \text{[Formula 9]}$$

From this power spectrum $\Psi_P$ (g, t) on a logarithmic scale axis, positional power of the musical scale c is added within an octave range from $Oct_L$ to $Oct_H$, whereby the 12-dimensional vector $$\vec{x}(t) \quad \text{[Formula 10]}$$

for each dimension $$\vec{x}_c(t) \quad \text{[Formula 11]}$$

is calculated as $$\tilde{x}_c(t) = \sum_{h=Oct_L}^{Oct_H} \int_{-\infty}^{\infty} BPG_{c,g} \Psi_p(g,t) dg \qquad \text{[Formula 12]}$$

Here, $BPG_{c,g}$ denotes a bandpass filter to pass through the power of the musical scale c and in the octave position h, namely, $$BPG_{c,g}(g) = \frac{1}{2}\left(1 - \cos\frac{2\pi(g-(G_{c,h}-100))}{200}\right) \qquad \text{[Formula 13]}$$

which is defined in the form of the Hanning window. In the embodiment of the present invention, the vector to be computed, namely, $$\tilde{x}(t) \qquad \text{[Formula 14]}$$

is normalized in accordance with the following formula to compute the chroma vector x(t).

$$x(t) = \frac{\tilde{x}(t)}{\|\tilde{x}(t)\|} \qquad \text{[Formula 15]}$$

In the embodiment of the present invention, by computing the chroma vector as described above, it is possible to obtain power distribution of the musical scales appropriately even in the case of a song signal including multiple pitches.

Next, computation of the transition matrix of musical scales will be described. In the best embodiment of the present invention, the acoustic feature quantity computing means 13 computes the transition matrix of musical scales by using the chroma vector x(t). In the embodiment of the present invention, when a set of chroma vectors at time t is defined as Xt=[x(1), x(2), ..., x(T−1)], transition of musical scales from time t to t+1 is expressed by the following formula with use of a transition matrix A.

[Formula 16]

$$X_{t+1} = AX_t \qquad \text{Expression (1)}$$

In this case, the transition matrix A is obtained by the following formula.

$$A = X_{t+1} X'_t (X_t X'_t)^{-1} \qquad \text{[Formula 17]}$$

Figure 23:
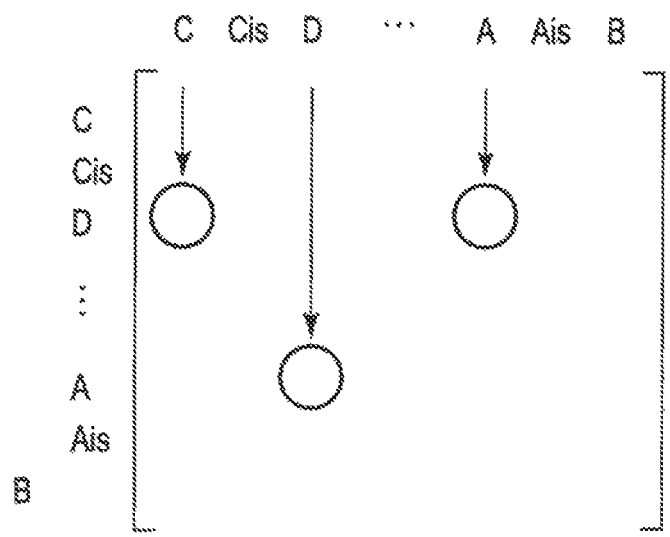
FIG. 23 is a view for explaining a transition matrix in the content search device according to the embodiment of the present invention.

The transition matrix A to be obtained by the above formula is 12×12 and each element thereof represents a degree of transition of a musical scale from time t to t+1. When the melody of the song is played sequentially from C to D to A to D, for example, the elements of the transition matrix A as shown in FIG. 23 is high. In this case, the transition matrix A is computed based on the chroma vector X representing the power distribution of the musical scales. Accordingly, transition of principal musical scales is reflected to the elements of the matrix A even in the case of the song signal including multiple pitches. Therefore, it is conceivable that the transition matrix A is able to express the characteristic transition of the musical scales of the song. When the embodiment of the present invention uses the following expression, $$A = \begin{pmatrix} a_1 \\ a_2 \\ \vdots \\ a_{12} \end{pmatrix} \qquad \text{[Formula 18]}$$

$$a_k - (a_{k1}, a_{k2}, \ldots, a_{k12})$$
$$(k - 1, 2, \ldots, 12)$$

the feature vectors of the acoustic signal included in the acoustic signal $f^{music}$ and the moving image signal $f^{video}$ respectively use the following.

$$a^{music} = (a_1^{music}, \ldots, a_{12}^{music}) \text{ and } a^{music} = (a_1^{music}, \ldots, a_{12}^{music}) \qquad \text{[Formula 19]}$$

In the embodiment of the present invention, the transition of musical scales is expressed by using the expression (1). Therefore, the melody, which is the transition of the musical scales, can be obtained as the transition matrix A without estimating a basic frequency indicated by a sound of a specified instrument which is conventionally difficult to estimate. In this way, the elements of the matrix A can be used as the feature quantities.

(Algorithm of Unknown Feature Quantity Computation Processing)

An algorithm of the unknown feature quantity computation processing by the unknown feature quantity computing means 14 will be described below. The unknown feature quantity computing means 14 analyzes the unknown feature quantities based on the principal component analysis or the canonical correlation analysis.

First, the unknown feature quantity computation processing according to the principal component analysis will be described. The principal component analysis is used as the method to extract explanatory variables from multivariate data in the field of the multivariate analysis. In the following, the method of estimating the feature quantities based on the principal component analysis will be concretely described.

In the embodiment of the present invention, the unknown feature quantity computing means 14 finds image feature vectors $v_j$, acoustic feature vectors $a_j$, and feature vectors $w_j$ based on semantics for all contents Cj (j=1, 2, ..., N) existing in a database. The unknown feature quantity computing means 14 finds vectors by sequentially arranging these vectors, namely, $$x = [v'_j, a'_j, w'_j]' \qquad \text{[Formula 20]}$$

Here, if any one of $v_j$, $a_j$, and $w_j$ is unknown, the unknown feature quantity computing means 14 sets all the elements of the vector to the same value. Moreover, the unknown feature quantity computing means 14 subjects the obtained vectors $x_1, x_2, \ldots, x_N$ to the principal component analysis, and obtains a matrix by sequentially arranging eigenvectors $u_1, u_2, \ldots, u_D$ (D dimensions) thereof, namely, $$U = [u_1, u_2, \ldots, u_D] \qquad \text{[Formula 21]}$$

In this embodiment, the unknown feature quantity for a new content is estimated as described below by using this matrix.

First, the image data will be described.

When an acoustic feature and a semantic feature are unknown among an image feature v, an acoustic feature a, and a semantic feature w, the unknown feature quantity computing means 14 defines the vector x as $$x = [v', 0', 0']' \qquad \text{[Formula 22]}$$

The unknown feature quantity computing means 14 finds a vector including estimation of the acoustic feature and the semantic feature, namely, $$x^{pca} = [\tilde{v}', \tilde{a}', \tilde{w}']' \quad \text{[Formula 23]}$$

as

[Formula 24]

$$x^{pca} = UU'(x - \bar{x}) + \bar{x} \quad \text{Expression (2)}$$

Here, $$\bar{x} \quad \text{[Formula 25]}$$

is an average vector of $x_j$ (j=1, 2, ..., N).

Next, the music data will be described.

When an image feature and a semantic feature are unknown among an image feature v, an acoustic feature a, and a semantic feature w, the unknown feature quantity computing means 14 defines the vector x as $$x = [0', a', 0']' \quad \text{[Formula 26]}$$

The unknown feature quantity computing means 14 obtains from the expression (2) a vector $x^{pca}$ including estimation of the image feature and the semantic feature.

Further, the moving image data will be described.

When a semantic feature is unknown among an image feature v, an acoustic feature a, and a semantic feature w, the unknown feature quantity computing means 14 defines the vector x as $$x = [v', a', 0']' \quad \text{[Formula 27]}$$

The unknown feature quantity computing means 14 obtains from the expression (2) a vector $x^{pca}$ including estimation of the semantic feature.

In the embodiment of the present invention, the feature quantity computing means 10 computes the feature quantities for the image, acoustic, and semantic factors by using the respective content data of the image data, the music data, and the moving image data provided with the texts representing the contents of targets in advance. Then, the unknown feature quantity computing means 14 subjects the respective feature quantities thus obtained to the principal component analysis to obtain the eigenspaces thereof. The content search device 1 according to the embodiment of the present invention is able to estimate the unknown feature quantities in the respective data by using the eigenspaces thus computed. However, it is preferable to widely select the respective feature quantities obtained from the respective content data of the image data, the music data, and the moving image data to be subjected to the principal component analysis in order to reflect characteristics of the target data sufficiently.

Next, the unknown feature quantity computation processing according to the canonical correlation analysis will be described. First, R sets of variable groups, namely, $$X_i^1, X_i^2, \ldots, X_i^{p_i} (i=1,\ldots,R; p_i \text{ means many dimensional number of variable group number } i) \quad \text{[Formula 28]}$$

are provided and n pieces of data on the R sets of variable groups, namely, $$x_i^{p_i} (=[X_i^{p_i}(1),\ldots,X_i^{p_i}(n)]') \quad \text{[Formula 29]}$$

are expressed by R pieces of matrices, namely, $$X_i = [x_i^1, x_i^2, \ldots, x_i^{p_i}] (i=1,2,\ldots,R) \quad \text{[Formula 30]}$$

The unknown feature quantity computing means 14 finds a weighted vector $w_i$ to be obtained by a linear transform $$g_i = X_i w_i \quad \text{[Formula 31]}$$

in the canonical correlation analysis. However, the unknown feature quantity computing means 14 sets an average of components included in $$x_i^{p_i} \quad \text{[Formula 32]}$$

to 0.

Here, by introducing an n-dimensional vector y including an unknown number, the unknown feature quantity computing means 14 estimates $w_i$ that minimizes a sum of squares of differences as described in the following formula for all the components of y and $X_i w_i$.

$$Q(y, w_i) = \sum_{i=1}^{R} \|y - X_i w_i\|^2 \quad \text{[Formula 33]}$$

$$(y'y = 1)$$

The unknown feature quantity computing means 14 firstly defines y as a known factor and minimizes the above-described formula for the respective components of the vectors $w_i$, whereby $$Q(y, w_i) \geq \sum_{i=1}^{R} \|y - X_i (X_i' X_i)^{-1} X_i' y\|^2 = \quad \text{[Formula 34]}$$

$$R\|y\|^2 - y' \sum_{i=1}^{R} (X_i (X_i' X_i)^{-1} X_i') y = Q(y)$$

holds true due to the nature of the least-square method. Note that this formula has equality if $$w_i = (X_i' X_i)^{-1} X_i' y \quad \text{[Formula 35]}$$

is applicable.

Next, in order to minimize Q(y) under a condition of y'y=1, a portion of a second item of Q(y) where a code is changed should be maximum for y under the same condition. Therefore, y is obtained as a solution of an eigenvalue problem of $$\sum_{i=1}^{R} (X_i (X_i' X_i)^{-1} X_i') y = \lambda y \quad \text{[Formula 36]}$$

Meanwhile, the unknown feature quantity computing means 14 obtains $$N_e (=\text{rank}(X_i' X_j)) \quad \text{[Formula 37]}$$

of positive eigenvalues $\lambda k$ (k=1, 2, ..., $N_e$) which satisfy the foregoing formula. When a matrix formed by sequentially arranging weighted vectors obtained from eigenvectors $y_k$ (k=1, 2, ..., $N_e$) corresponding thereto is defined as $$W_i = [w_i^1, w_i^2, \ldots, w_i^{N_e}] (i=1,2,\ldots,R) \quad \text{[Formula 38]}$$

the following formula holds true.

$$W_i' X_i' X_j W_j = \begin{bmatrix} \mu_1 & 0 & \cdots & 0 \\ 0 & \mu_2 & & \\ \vdots & & \ddots & \\ 0 & & & \mu_{N_e} \end{bmatrix} = \Lambda_{ij} \quad \text{[Formula 39]}$$

Here, $\Lambda_{ij}$ is a correlation matrix applying canonical correlation coefficients $\mu_k$ (k=1, 2, . . . , $N_e$) to diagonal elements.

Figure 24:
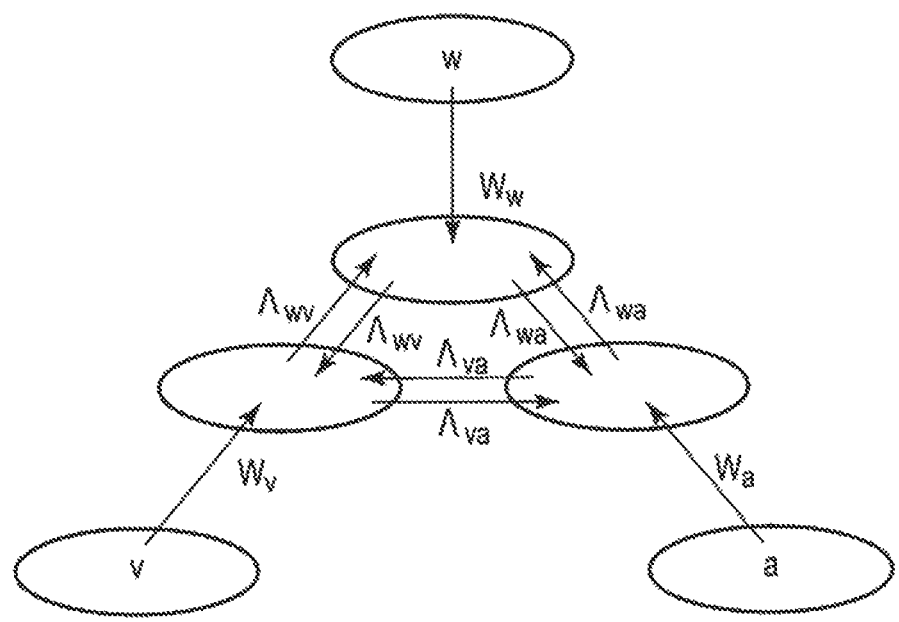
FIG. 24 is a view for explaining a correlation matrix obtained from a canonical correlation analysis by the content search device according to the embodiment of the present invention.

By using the above-described canonical correlation analysis, the unknown feature quantity computing means 14 can find the linear transform which maximizes the correlations among the R sets of different variable groups. As shown in FIG. 24, the unknown feature quantity computing means 14 according to the embodiment of the present invention carries out the canonical correlation analysis by defining the number of media as R=3 and defining the number of contents as n pieces, thereby obtaining the correlation matrices. By using these matrices, the unknown feature quantity computing means 14 of the embodiment of the present invention estimates the unknown feature quantities for a new content from the known features in accordance with any of the following formulae.

The unknown feature quantity computing means 14 estimates the unknown image feature quantities for a new content from the known features in accordance with any of the following formulae.

$$\tilde{v} = W'_v v$$

$$\tilde{v} = \Lambda_{va} W'_a a$$

$$\tilde{v} = \Lambda_{wv} W'_w w \qquad \text{[Formula 40]}$$

The unknown feature quantity computing means 14 estimates the unknown acoustic feature quantities for a new content from the known features in accordance with any of the following formulae.

$$\tilde{a} = \Lambda_{va} W'_v v$$

$$\tilde{a} = W'_a a$$

$$\tilde{a} = \Lambda_{wa} W'_w w \qquad \text{[Formula 41]}$$

The unknown feature quantity computing means 14 estimates the unknown semantic feature quantities for a new content from the known features in accordance with any of the following formulae.

$$\tilde{w} = \Lambda_{wv} W'_v v$$

$$\tilde{w} = \Lambda_{wa} W'_a a$$

$$\tilde{w} = W'_w w \qquad \text{[Formula 42]}$$

Further, the unknown feature quantity computing means 14 obtains a vector estimating the unknown feature.

$$x^{cca} = [\tilde{v}', \tilde{a}', \tilde{w}']' \qquad \text{[Formula 43]}$$

In the embodiment of the present invention, the feature quantity computing means 10 computes the feature quantities respectively for the image, acoustic, and semantic factors by using the respective content data of the image data, the music data, and the moving image data provided with the texts representing the contents of targets in advance. Then, the unknown feature quantity computing means 14 subjects the respective feature quantities thus obtained to the canonical correlation analysis to obtain the canonical correlation coefficients that maximize correlations of the respective features as well as to obtain the correlations. Accordingly, in the embodiment of the present invention, it is possible to compare the respective feature quantities, which cannot be compared as they are. However, it is preferable to widely select the respective feature quantities obtained from the respective content data of the image data, the music data, and the moving image data to be subjected to the canonical correlation analysis in order to reflect characteristics of the target data sufficiently.

(Algorithm of Distance Computation Processing)

An algorithm of the distance computation processing by the distance computing means 15 will be described below. The distance computing means 15 computes the unweighted distances or the weighted distances.

First, the distance computation processing in the case of computing the unweighted distances will be described.

Now, the query content is assumed to be $C^q$ and the target content is assumed to be $C^f$. In this case, the distance computing means 15 computes the unweighted distance of the image feature between these contents, namely, $$d_v^{L2} \qquad \text{[Formula 44]}$$

the unweighted distance of the acoustic feature therebetween, namely, $$d_a^{L2} \qquad \text{[Formula 45]}$$

and the unweighted distance of the semantic feature therebetween, namely, $$d_w^{L2} \qquad \text{[Formula 46]}$$

respectively in accordance to the following formulae.

$$d_v^{L2} = \|\tilde{v}^q - \tilde{v}^f\|^2$$

$$d_a^{L2} = \|\tilde{a}^q - \tilde{a}^f\|^2$$

$$d_w^{L2} = \|\tilde{w}^q - \tilde{w}^f\|^2 \qquad \text{[Formula 47]}$$

where the vectors, namely, $$\tilde{v}^q \text{ and } \tilde{v}^f \qquad \text{[Formula 48]}$$

are the vectors of the image feature in the vectors x of $C^q$ and $C^f$ to be obtained in the unknown feature quantity computation processing by the unknown feature quantity computing means 14. Similarly, the vectors, namely, $$\tilde{a} \text{ and } \tilde{w} \qquad \text{[Formula 49]}$$

are the vectors of the acoustic feature and the semantic feature.

Next, the distance computation processing in the case of computing the weighted distances will be described. The distance computing means 15 computes the weighted distance of the image feature between these contents base on Mahalanobis distances, namely, $$d_v^m \qquad \text{[Formula 50]}$$

the weighted distance of the acoustic feature therebetween, namely, $$d_a^m \qquad \text{[Formula 51]}$$

and the weighted distance of the semantic feature therebetween, namely, $$d_w^m \qquad \text{[Formula 52]}$$

respectively in accordance to the following formulae.

$$d_v^m = (\tilde{v}^q - \tilde{v}^f)' W_v (\tilde{v}^q - \tilde{v}^f)$$

$$d_a^m = (\tilde{a}^q - \tilde{a}^f)' W_a (\tilde{a}^q - \tilde{a}^f)$$

$$d_w^m = (\tilde{w}^q - \tilde{w}^f)' W_w (\tilde{w}^q - \tilde{w}^f) \qquad \text{[Formula 53]}$$

Here, respective matrices $W^v$, $W^a$, and $W^w$ are covariance matrices of the image, acoustic, and semantic features in all of the contents targeted for search and classification, which are found by the following formulae.

$$W^v = \frac{1}{N} X_v X_v' \quad \text{[Formula 54]}$$

$$W^a = \frac{1}{N} X_a X_a'$$

$$W^w = \frac{1}{N} X_w X_w'$$

However, $$X_v = [\tilde{v}_1, \tilde{v}_2, \ldots, \tilde{v}_N]',$$

$$X_a = [\tilde{a}_1, \tilde{a}_2, \ldots, \tilde{a}_N]',$$

$$X_w = [\tilde{w}_1, \tilde{w}_2, \ldots, \tilde{w}_N]' \quad \text{[Formula 55]}$$

hold true. Here, N is the total number of contents.

(Algorithm of Display Processing)

An algorithm of the display processing by the display means 16 will be described below. The display means 16 displays the search result on the display screen of the display device 105 based on the distance data 35 outputted by the distance computing means 15. A thumbnail of a certain content is displayed closer to a thumbnail of a query content as the distance between the certain content and the query content is smaller, i.e., as the contents are more similar to each other. On the other hand, the thumbnail of the certain content is displayed farther from the thumbnail of the query content as the distance between the certain content and the query content is larger, i.e., as the contents are less similar to each other.

In the embodiment of the present invention, the search result retaining the similarity relations between the contents is visualized by applying multidimensional scaling (MDS) to the distances between the feature vectors computed for the respective contents.

The feature vectors computed for n pieces of the contents are defined as $x_1, \ldots, x_n$ while an n×n matrix having elements of squared values of the distances between $x_i$, $x_j$ is defined as D. Meanwhile, an n×n matrix to be obtained as a result of subtracting a matrix having values of all elements equal to 1/n from a unit matrix is defined as J. Moreover, given that $$P = (-\tfrac{1}{2}) JDJ^T \quad \text{[Formula 56]}$$

and when an estimated position in a k-dimensional space of an i-th content is assumed to be $$\hat{x}_i \quad \text{[Formula 57]}$$

and when an n×k matrix formed by n rows of the above factors is assumed to be X to be obtained, then, $$XX^T \quad \text{[Formula 58]}$$

minimizes the following formula.

[Formula 59]

$$\phi = \text{trace}[(P - XX^T)^2] \quad \text{Expression (3)}$$

Among the eigenvalues of P, assuming that $\Lambda_k$ is a matrix using a maximum of k pieces of the eigenvalues as the diagonal elements and that $Q_k$ is a matrix of the eigenvectors corresponding thereto, then a layout of the content according to multidimensional scaling, namely, $$\hat{X} \quad \text{[Formula 60]}$$

is computed in accordance with the following formula.

$$\hat{X} = Q_r \Lambda_k^{1/2} \quad \text{[Formula 61]}$$

However, at least k pieces of the positive eigenvalues are assumed to exist in P. The layout of the contents, namely, $$\hat{X} \quad \text{[Formula 62]}$$

to be obtained by the expression (3) minimizes the expression (3) and is a solution that approximates the distances between the contents in k dimensions based on a least-squares standard.

As described above, the content search device 1 according to the embodiment of the present invention computes any one or more of the image, semantic, and acoustic feature quantities by using any of the image, moving image, and music content data. Further, the content search device 1 is able to compute the unknown feature quantities in the content data by using the feature quantities computed for the respective content data, and to associate all the image, semantic, and acoustic feature quantities with the respective content data.

The above-described content search device 1 can perform a cross-sectional search irrespective of the content types such as a search for the music data similar to the image data or the image data similar to the moving image data. Therefore, a user can search for similar content data to the query content data one after another by using the content search device 1. The user can search for desired content data from a large amount of the content data. Moreover, it is possible to acquire a sensuous search result such as a search for the music data matching the image data by outputting the search result in the cross-sectional manner.

First Modified Example

As a first modified example of the present invention, description will be given of a case of computing the feature quantity with a focus placed on refrain sections of an acoustic signal. Here, a refrain section is a "hook" of a song, for example.

In the embodiment of the present invention, the feature quantities are computed by using the entire song. Accordingly, there is a risk of degradation in extraction accuracy as the computed feature quantities are smoothed by the length of time. Therefore, in the first modified example, a section appearing most frequently in a song is detected by introducing a method of detecting a refrain section of the song and a similarity between songs is computed by using a transition matrix obtained from the section. By using the similarity to be computed from the refrain section of the song as described above, the first modified example allow extraction of similar songs at high accuracy.

In a content search device 1*a* according to the first modified example of the present invention, the acoustic feature quantity computing means 13 performs processing differently from that of the content search device 1 according to the embodiment of the present invention described with reference to FIG. 1.

The acoustic feature quantity computing means 13 specifies a melody that appears repeatedly in the acoustic signal and defines the feature quantity of the repeated melody as the feature quantity of the acoustic feature. Therefore, the acoustic feature to be stored in the feature quantity data storage unit 34 is the feature quantity of the refrain section of the acoustic signal, which is deemed to be the feature quantity with a focus placed on the feature of the song. In the content search device 1*a* different from the first embodiment of the present invention, the songs to be processed by the acoustic feature quantity computing means 13 are an acoustic data portion of the moving image data stored in the moving image data storage unit 32 of the content data storage unit 30 and the music data stored in the music data storage unit 33.

Next, description will be given of the processing by the acoustic feature quantity computing means 13 according to the first modified example of the present invention. As preprocessing, the acoustic feature quantity computing means 13 divides a song signal into fixed length frames and computes a chroma vector Xt as the feature quantity by using a frame at time t. Further, the acoustic feature quantity computing means 13 detects the refrain section by using the similarities computed for all frame combinations.

Specifically, the acoustic feature quantity computing means 13 finds correlation coefficients between $X_t$ and $X_{t-1}$ ($0 \le l \le t$) as similarities r (t, l) ($-1 \le r$ (t, l)$\le 1$). When the similarities r (t, l) are drawn on a t–l plane in which a horizontal axis represents t and a vertical axis represents l, a region where the similarities are continuously high emerges as a line segment parallel to the time axis so as to correspond to the refrain section in the song. Accordingly, the acoustic feature quantity computing means 13 can obtain the refrain section in the song by detecting this line segment.

However, a chroma vector having elements substantially equal to one another tends to have a high similarity to other chroma vectors, and such a vector may emerge on the t–l plane as a straight line having a high similarity. In order to remove such a straight line, the acoustic feature quantity computing means 13 according to the first modified example of the present invention detects the refrain section at high accuracy by emphasizing the line segment parallel to the time axis by use of a moving average filter.

In the first modified example of the present invention, a focus is placed on a section containing the melody that is repeated most frequently among the refrain sections in the song. In general, a portion where the most representative motif in the song is shown tends to be repeated. Accordingly, the acoustic feature quantity computing means 13 computes an appropriate similarity between the songs by using the feature quantity extracted from such a section.

Next, description will be given of processing by the acoustic feature quantity computing means 13 to compute the feature quantity representing transition of musical scales in the song by using the refrain section. In the first modified example of the present invention, time variation from a chroma vector $X_t$ to a chroma vector $X_{t+1}$ is expressed by the following formula by use of the transition matrix A.

$$x_{t+1} = A x_t \quad [\text{Formula 63}]$$

Here, the matrix A that minimizes an average of $$E(t) = \|x_{t+1} - A x_t\|^2 \quad [\text{Formula 64}]$$

concerning t in the refrain section is obtained by the following formula.

[Formula 65]

$$A = X_{t+1} X'_t (X_t X'_t)^{-1} \quad \text{Expression (4)}$$

Note that $X_t$ and $X_{t+1}$ are respectively expressed by $$X_t = [x(1), x(2), \ldots, x(T-1)]$$

$$X_{t+1} = [x(2), x(3), \ldots, x(T)] \quad [\text{Formula 66}]$$

Here, T denotes a total number of the chroma vectors to be computed by using the refrain section. The size of the transition matrix thus obtained is L×L (L=12).

In the first modified example of the present invention, it is possible to obtain the feature quantity representing the transition of musical scales, which is conventionally difficult to obtain, by computing the transition matrix A in accordance with the expression (4).

Next, the acoustic feature quantity computing means 13 computes the correlation coefficient of the transition matrix as the similarity between the songs by using the feature quantity representing the transition of musical scales.

Here, the transition matrix of musical scales to be computed by using the refrain sections n (n=1, 2, . . . , N; N is a total number of the refrain sections) of a query song is defined as $$A_Q^n \quad [\text{Formula 67}]$$

The transition matrix of musical scales to be computed by using the refrain sections m (m=1, 2, . . . , M; M is a total number of the refrain sections) of a song stored in the content data storage unit 30 is defined as $$A_R^m \quad [\text{Formula 68}]$$

In this case, the acoustic feature quantity computing means 13 computes the correlation coefficients between the refrain sections n of the query song and the refrain sections m of the song stored in the content data storage unit 30 by the following formula.

$$R_{n,m} = \frac{S_{A_Q^n A_R^m}}{S_{A_Q^n} S_{A_R^m}} \quad [\text{Formula 69}]$$

Here, it is to be noted that $$S_{A_Q^n A_R^m}, S_{A_Q^n}, S_{A_R^m} \quad [\text{Formula 70}]$$

are obtained by the following formulae.

$$S_{A_Q^n A_R^m} = \sum_{i=1}^{L} \sum_{j=1}^{L} (A_Q^n(i,j) - \mu_Q^n)(A_R^m(i,j) - \mu_R^m) \quad [\text{Formula 71}]$$

$$S_{A_Q^n} = \sqrt{\sum_{i=1}^{L} \sum_{j=1}^{L} (A_Q^n(i,j) - \mu_Q^n)^2}$$

$$S_{A_R^m} = \sqrt{\sum_{i=1}^{L} \sum_{j=1}^{L} (A_R^m(i,j) - \mu_R^m)^2}$$

$$\mu_Q^n = \frac{1}{L^2} \sum_{i=1}^{L} \sum_{j=1}^{L} A_Q^n(i,j) \quad [\text{Formula 72}]$$

$$\mu_R^m = \frac{1}{L^2} \sum_{i=1}^{L} \sum_{j=1}^{L} A_R^m(i,j)$$

Second Modified Example

Figure 25:
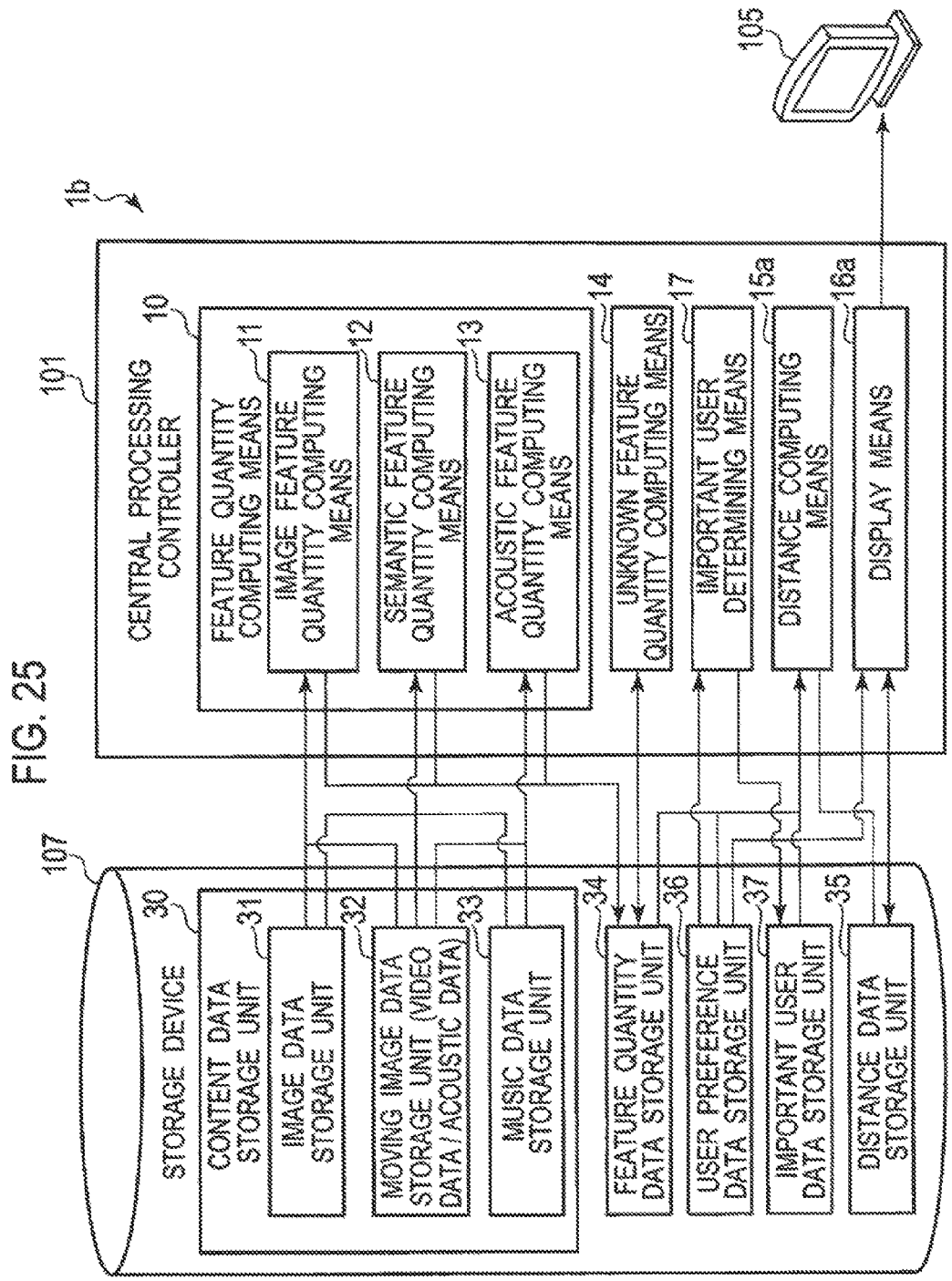
FIG. 25 is a view for explaining functions of a content search device according to a second modified example of the present invention.

With reference to FIG. 25, description will be given of a content search device 1b according to a second modified example of the present invention. As compared to the content search device 1 according to the embodiment of the present invention shown in FIG. 1, the content search device 1b shown in FIG. 25 is different in that the storage device 107 includes a user preference data storage unit 36 and an important user data storage unit 37, and that the central processing controller 101 includes important user determining means 17. Moreover, processing by distance computing means 15a and display means 16a in FIG. 25 is partially different from the processing by the distance computing means 15 and the display means 16 shown in FIG. 1.

The user preference data storage unit 36 is a storage area which stores user preference data 36a. The user preference data 36a are data in which a user identifier is associated with the content identifiers that matches preference of the user.

The user preference data 36a may be generated from a playlist saved in a user terminal used by the user, for example. The content search device 1b may also generate the user preference data 36a from a user terminal by receiving the identifier of the user and the identifier of the content recorded in the playlist.

Meanwhile, the user preference data 36a may be generated by displaying a screen on the user terminal for inputting the content that matches the preference, causing the content search device 1b to receive the content individually specified by the user, and associating the identifier of the user with the identifier of the received content, for example.

Important user data 37a are stored in the important user data storage unit 37. The important user data 37a are the data storing an identifier of an important user representing a set of users who prefer the content. Therefore, the important user data 37a are the data in which the identifier of the content is associated with the identifier of the important user of the content.

The important user determining means 17 to be described later determines the important user, generates the important user data 37a, and stores the data in the important user data storage unit 37. Only one important user may be selected for one content. Alternatively, multiple users may be selected as the important users for each of the contents, the multiple users having a score to be computed in accordance with the following expression (6) equal to or above a predetermined value.

For each of the content identifiers, the important user determining means 17 creates a set of the user identifiers associated with the content in the user preference data 36a, then creates directed edges between the users in each set, and determines the important user who represents each set. The important user is the user who can express a characteristic of many other users by way of the content identifier associated with the important user, for example. The important user is the user who is qualified to own suitable information on an inputted keyword. Ideally, a relatively small number of content identifiers are associated with the important user, and those content identifiers are preferably associated with other users as well.

The important user determining means 17 creates the directed edges between the users based on the preference of the users and thereby forms a user network. The directed edge (link) is provided when the users share the same content. Meanwhile, the directed edge is not provided when the users do not share the same content. This directed edge defines a user owning a larger number of contents as the origin of the link and a user owning a smaller number of contents as a link destination.

The important user determining means 17 applies a HITS (hypertext induced topic selection) algorithm to this network to determine an authority. In the second modified example of the present invention, the important user determining means 17 outputs a user serving as the authority as the important user.

Figure 26:
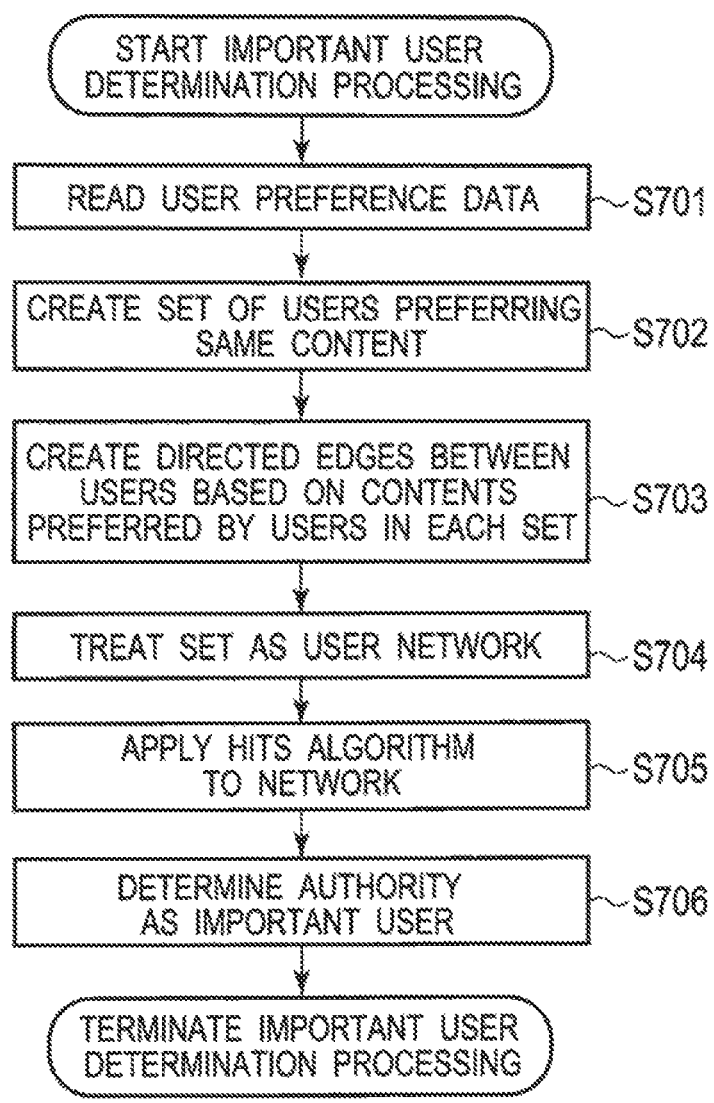
FIG. 26 is a flowchart for explaining important user determination processing to determine an important user by the content search device according to the second modified example of the present invention.

With reference to FIG. 26, description will be given of important user determination processing by the important user determining means 17 according to the second modified example of the present invention.

First, the important user determining means 17 reads out the user preference data 36a in step S701 and creates the set of users who prefer the same content in step S702. Here, one set of users is created for one user identifier. Further, in step S703, the important user determining means 17 creates the directed edges between the users in each set based on the content preferred by the users.

In step S704, the important user determining means 17 defines, as the user network, the set for each content created in step S703 so as to link the users with one another by use of the directed edges. In step S705, the important user determining means 17 applies the HITS algorithm to the network defined in step S704. In step S706, the important user determining means 17 determines the authority as the important user and outputs the authority.

The distance computing means 15a extracts the content identifier which is associated with the user identifier of the important user in the user preference data 36a. Further, from the feature quantity data 34a, the distance computing means 15a extracts the feature quantities and the feature estimated values corresponding to the extracted content identifier, and computes the distances indicating the similarities among the respective content data based on the feature quantities and the feature estimated values.

In computing the distances indicating the similarities among the respective content data based on the feature quantities and the feature estimated values stored in the feature quantity data 34a, the distance computing means 15a computes the distances indicating the similarities among the respective content data with consideration given to the content which is associated with the user identifier of the important user in the user preference data 36a.

The important user in the network of the users who prefer the query content is presumed to properly represent the content preferred by all of the users in the network. Therefore, the distance computing means 15a may subject the set of content identifiers associated with the identifier of the important user in the user preference data 36a to the principal component analysis or the canonical correlation analysis without consideration given to the preference data of the users other than the important user. Moreover, after performing the principal component analysis or the canonical correlation analysis, the distance computing means 15a may calculate the distances based on city block distances or Mahalanobis distances and may compute the similarities among the contents. It is possible to compute the similarities at high accuracy and in a small calculation amount by computing the similarities with use of only the contents associated with the specific important user.

Figure 27:
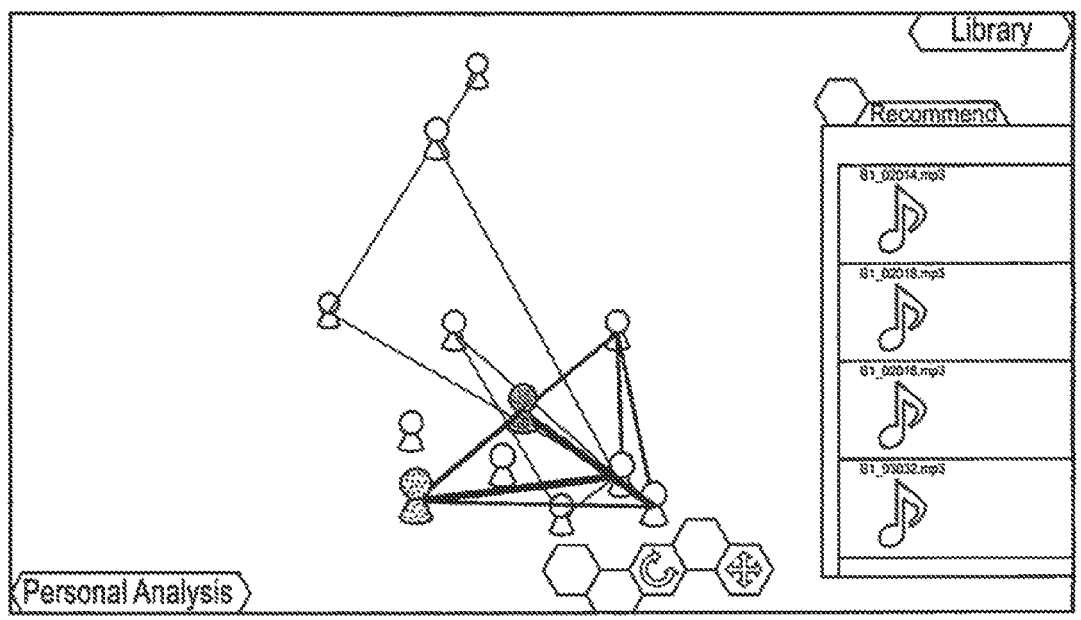
FIG. 27 is a view for explaining an example of a screen of the content search device according to the second modified example of the present invention, which is configured to display a user network.

The display means 16a determines the display positions of the thumbnails corresponding to the content data based on the distances computed by the distance computing means 19, and displays a screen as shown in FIG. 27, for example, on the display device 105. Further, for the user preference data 36a, the display means 16a extracts the identifiers of the multiple users associated with a certain content, and displays the user network including nodes as the respective identifiers of the multiple users and the links between the nodes with consideration given to the directed edges between the users on the display device 105.

When this user network is displayed on the display device 105 and when a node is selected, the display means 16a may extract the identifiers of the contents associated with the identifier of the user corresponding to the node for the user preference data 36a and may display a list of the identifiers of the contents on the display means 16a. For example, the user is able to select a node of another user having similarity to the selecting user itself, i.e., the user displayed close within the user network and connected by a thick link, and to refer to the list of the contents that the user is interested in. In this way, the user can grasp the contents that match his or her preference in the list of the contents of the user having the similar preferences.

Here, the distance of the link in the user network is determined by the similarity between the feature quantities. Meanwhile, the thickness of the link in the user network corresponds to the number of the identifiers of the shared contents among the identifiers of the contents associated with the identifiers of these users for the user preference data 36a. For example, the length of the link between the nodes is shorter and the link is thicker when there is a high degree of similarity between the feature quantities of the contents preferred by the users and when many contents are shared.

The above-described content search device 1b according to the second modified example of the present invention creates, for each of the contents, the set of the users who prefer the same content. Moreover, the content search device 1b creates the directed edges between the respective users based on inclusion relations of the contents preferred by the respective users. It is possible to extract the important user in each of the network by applying a link analysis and the like to a directed graph thus obtained.

In addition, by computing the similarities among the contents based on the list of the contents matching the preference of the important user, it is possible to reduce the calculation amount while maintaining accuracy of the similarities.

Meanwhile, the user can learn a new content by displaying this user network and acquiring the list of the contents matching the preference of the user.

(Detailed Algorithm)

First, description will be given of processing to create a network based on the preference of the user by the important user determining means 17 using the HITS.

In the second modified example of the present invention, if the respective users prefer the same content, then the respective users are assumed to belong to the same network. Meanwhile, the network corresponding to each of the contents is defined by use of the following matrix $L_k$ (k∈{1, 2, . . . , N; N is a total number of the contents}) expressed in a formula using link relations among the respective users as elements. Here, an element on i-th row and j-th column of the matrix $L_k$ is expressed as $L_k(i,j)$. The total number of contents preferred by a user i is expressed as $F_i$. The number of shared contents preferred by the user and a user j is expressed as $C_{i,j}$.

Expression (5)

$$L_k(i, j) = \begin{cases} \dfrac{C_{i,j}}{F_i} & (F_i \geq F_j)(i \neq j) \\ 0 & (F_i < F_j) \end{cases}$$ [Formula 73]

As described above, according to the second modified example of the present invention, it is possible to extract the important user (hereinafter also referred to as an "authority") in the network considering the contents preferred by the users by subjecting the obtained matrix $L_k$ to processing such as a link analysis. Therefore, by focusing a search on the content preferred by the extracted authority, it is possible to present the similar content with consideration given to the preference of each user.

In the following, a method using the HITS algorithm will be described as an example of a concrete method of extracting the authority in order to realize the search for the similar content with consideration given to the preference of the user.

The HITS is the method of finding the users (the authorities) deemed to own the proper information on the inputted keyword and a user (a hub) having multiple links with these authorities by means of the link analysis. The authority and the hub are recursively defined as "a good authority is linked with multiple hubs while a good hub establishes links with multiple authorities". The authority and the hub are found by scoring using the link analysis based on this definition.

Here, the link in the present invention is computed by use of the feature quantities of the preferred contents associated with the respective users in the user preference data. For example, if a user owns many blue images for the image data, then the user is connected by a thick link with another user similarly owning many blue images.

Procedures of the HITS processing are shown below.

Procedure (1)

All users are assumed to belong to a base set and all link patterns of the users belonging to the base set are investigated to create an adjacency matrix $L=[l_{ij}]$. Here, the adjacency matrix is the matrix configured to define $l_{ij}=1$ when there is a link directed from the user i to the user j and to define 0 in any other cases. However, in the HITS, the adjacency matrix is created while existence of links between the users who belong to the same host l is ignored.

Procedure (2)

Two types of scores, namely, an authority score $a_i$ and a hub score $h_i$ are defined for the user i as shown in an expression (6) and an expression (7), respectively. Further, both of the scores are computed in accordance with the expression (6) and the expression (7).

Expression (6)

$$a_i = \alpha \sum_{j=1}^{n} l_{ji} h_j$$ [Formula 74]

Expression (7)

$$h_i = \beta \sum_{j=1}^{n} l_{ij} a_j$$ [Formula 75]

Here, n denotes the total number of the users belong to the base set while α and β denote normalization constants. Processing to "assign $a_i$ obtained by the expression (6) to $a_j$ in the expression (7)" and processing to "assign $h_i$ obtained by the expression (7) to $h_j$ in the expression (6)" are repeated and updated until the values $a_i$ and $h_i$ cease to change. This update processing is performed for all of the users included in the base set.

Procedure (3)

The user having a high authority score is defined as the authority and the user having a high hub score is defined as the hub, respectively. This procedure (3) is repeated until convergence of the authority scores and the hub scores of the respective users.

In the expression (6), the authority score of the user i is computed by use of a sum of the hub score of the user who establishes the link with the user i. Meanwhile, in the expression (7), the hub score of the user i is computed by use of a sum of the authority score of the user who is linked with the user i. By repeating this computation processing until the convergence, the important user determining means 17 obtains the authority and the hub matching the above-described recursive definition.

Next, description will be given of the distance computation processing by the distance computing means 15a based on the authority obtained by the important user determining means 17.

In the second modified example of the present invention, the distances are computed in consideration of the features of the contents preferred by the authority determined by the above-described HITS by using the distance computation method described in the embodiment of the present invention.

The method of computing the distance will be described below for distance computation based on the city block distance and distance computation based on the Mahalanobis' generalized distance.

First, description will be given of the distance computation processing based on the city block distance.

The distance computing means 15a subject the set of contents preferred by the authority determined by the HITS to the principal component analysis or the canonical correlation analysis described in conjunction with the distance computing means 15 of the embodiment of the present invention. In this way, the distance computing means 15a finds the matrices U as well as $W_v$, $W_a$, $W_w$, $\Lambda_{va}=\Lambda_{(av)}$, $\Lambda_{aw}=\Lambda_{(wa)}$, and $\Lambda_{vw}=\Lambda_{(wv)}$, thereby obtaining a vector $x^{pca}$ and a vector $x^{cca}$. Moreover, the distance computing means 15a computes the distance by using vector $x^{pca}$ and the vector $x^{cca}$ in accordance with the computation method described in conjunction with the distance computing means 15 of the embodiment of the present invention.

Next, the distance computation processing based on the Mahalanobis' generalized distance will be described.

The distance computing means 15a computes weighted matrices by using all of the contents preferred by the authority for a query content q to be determined by the HITS. Here, all of the contents preferred by the authority are the contents, for the user preference data 36a, corresponding to the content identifiers associated with the identifier of the user defined as the authority. The weighted matrices are computed in accordance with the following formulae.

[Formula 76]
$$W_q^v = \frac{1}{N_{auth}} X_v X_v'$$
$$W_q^a = \frac{1}{N_{auth}} X_a X_a'$$
$$W_q^w = \frac{1}{N_{auth}} X_w X_w'$$

Here $X_v=[\tilde{v}_1, \tilde{v}_2, \ldots, \tilde{v}_{N_{auth}}]'$,
$X_a=[\tilde{a}_1, \tilde{a}_2, \ldots, \tilde{a}_{N_{auth}}]'$, $X_w=[\tilde{w}_1, \tilde{w}_2, \ldots, \tilde{w}_{N_{auth}}]'$
$N_{auth}$ is total number of contents which the authority preferences.

The distance computing means 15a computes the distances by using the aforementioned weighted matrices and in accordance with the computation method described in conjunction with the distance computing means 15 of the embodiment of the present invention.

Here, the authority in the network of the users who prefer the query content properly represents the content preferred by all of the users in the network. Therefore, the distance computing means 15a can weight the distance in consideration of the content preferred by the authority by computing the distance as described above. In this way, the content search device 1b can search for or classify the similar content while reflecting the preference of the user.

Next, the user network to be displayed by the display means 16a will be described in detail.

In the second modified example of the present invention, as the user network display is operated by the user in the course of replaying the content such as the moving image signal, the network of the users who prefer the content being replayed is constructed. The display means 16a displays the result of construction on the display device 105. The user network is displayed based on a relation of three-dimensional coordinate positions computed in accordance with multidimensional scaling. In the network, the respective users present in the network are displayed as the nodes. When an arbitrary user in the network is selected, the display means 16a displays the list of the contents preferred by the user.

Here, the display means 16a displays the selected user, the user defined as the authority and the user defined as the hub in the network by using colors or patterns different from each other. Meanwhile, the link relation between the users in the network is displayed by use of thickness of the line and a flow of a ball. In the second modified example of the present invention, the direction of the link is displayed by way of displaying as if the ball is flowing from the origin of the link to the destination of the link. In this case, the line is drawn thicker when the value of the element in the matrix representing the network computed by the expression (5) is larger, and the direction of the link is expressed by the flow of the ball.

The user network which is visualized as described above can visually represent the link relations among the users while reflecting the preference of the respective users as well as the degree thereof. In addition, when a search operation is inputted so as to define the content preferred by the user as the query, the display means 16a recomputes and displays the coordinates of the search result to be displayed based on the coordinates in the two-dimensional space computed by use of multidimensional scaling with the query located in the center, and then arranges and displays the search result. In this way, the research result reflecting the preference of the user in the network is displayed. Hence the user can visually grasp the degree of similarity between the contents through the positional relations of the displayed multiple contents.

Other Embodiments

Although the present invention has been described above with reference to the embodiment, the first modified example, and the second modified example, it is to be understood that the statements and drawings constituting part of this disclosure are not intended to limit this invention. Various alternative embodiments, examples, and operational techniques will be apparent from this disclosure for those skilled in the art.

For example, the content search device disclosed in the embodiment of the present invention may be constructed on a single piece of hardware as illustrated in FIG. 1 or may be constructed on multiple pieces of hardware depending on functions or the numbers of processing thereof. Alternatively, the content search device may be implemented on an existing information system.

It is needless to say that the present invention encompasses various embodiments which are not expressly stated herein. Accordingly, the technical scope of the present invention should be determined solely by the matters to define the invention pursuant to the claims which are deemed appropriate from the description made above.

The invention claimed is:

1. A content search device configured to search for similar content data, comprising:
   a content data storage unit configured to store a plurality of pieces of content data in association with respective content identifiers in a storage device, each of the plurality of pieces of content data including at least one known feature type selected from a group of feature types including an image feature, an acoustic feature and a semantic feature, at least one piece of content data including feature types;
   feature quantity computing means for
      computing, for each piece of the content data stored in the content data storage unit, a known feature quantity corresponding to a known feature type included in a target piece of the content data, associating, as associated data sets for each piece of the content data, a content identifier of the target piece of the content data, the known feature type of the target piece of the content data, and the computed known feature quantity to each other, and storing the associated data sets in the storage device as feature quantity data;

unknown feature quantity computing means for computing a vector space from the feature quantity data including sets of the known feature quantity, computing, for each piece of the content data, an unknown feature quantity corresponding to an unknown feature type based on correlations between (i) the known feature quantity corresponding to the known feature type included in the target piece of the content data and (ii) the computed vector space, the unknown feature type being different from the known feature type included in the target piece of the content data, and associating, for each piece of the content data, the content identifier of the target piece of the content data, the unknown feature type, and the computed unknown feature quantity to update the feature quantity data;

distance computing means for computing a distance indicating a similarity between each two pieces of the content data based on the known feature quantities and the unknown feature quantities stored in the feature quantity data;

display means for determining a display position of a thumbnail for each piece of the content data based on the distances computed by the distance computing means, and for displaying the thumbnail on a display device; and a determining unit for determining which, if any, of the content data stored in the content data storage unit does not have each of an image feature, an acoustic feature and a semantic feature stored therewith in the content data storage unit, and wherein the unknown feature quantity computing means computes respective unknown feature quantities for each of the content data stored in the content data storage unit that do not have an image feature, an acoustic feature and a semantic feature stored therewith in the content data storage unit.

2. The content search device according to claim 1, wherein the unknown feature quantity computing means computes the vector space including the known feature quantities for each of the known feature types of pieces of the content data in the content data storage unit.

3. The content search device according to claim 1, wherein the unknown feature quantity computing means:

computes vector spaces corresponding to each of the feature types, computes correlations between two vector spaces corresponding to two feature types selected from the group of feature types, and computes the unknown feature quantity in the target piece of the content data based on: (i) the known feature quantity in the target piece of the content data, (ii) the vector space corresponding to the known feature type of the target piece of the content data, and (iii) the correlation between the vector space corresponding to the unknown feature type in the target piece of the content data and the vector space corresponding to the known feature type in the target piece of the content data.

4. The content search device according to claim 1, wherein in computing the feature quantity of the acoustic feature, the feature quantity computing means specifies a melody appearing repeatedly in an acoustic signal and defines a feature quantity of the repeated melody as the feature quantity of the acoustic feature.

5. The content search device according to claim 1, further comprising:

a user preference data storage unit configured to store user preference data in the storage device, the user preference data being data in which an identifier of a user is associated with a content identifier matching preference of the user; and important user determining means for creating a set of the user identifiers associated with the content of each of the content identifiers in the user preference data, for creating a directed edge between the users in each set, and for determining an important user representing each set, wherein the distance computing means extracts the content identifiers from the user preference data associated with the user identifier of the important user, and computes a distance indicating a similarity between each two pieces of the content data based on the known feature quantities and the unknown feature quantities corresponding to the extracted content identifiers.

6. The content search device according to claim 5, wherein the display means further extracts a plurality of user identifiers associated with a certain content from the user preference data, and displays a user network on the display device, the user network including nodes as the respective identifiers of the plurality of users, and links between the nodes with consideration given to directed edges between the users.

7. The content search device according to claim 1, wherein the display means determines a display position of a plurality of thumbnails corresponding to other content data for each piece of the content data based on the distances computed by the distance computing means, and displays each thumbnail on the display means as a particular distance from the content data associated with each thumbnail, such that the further a particular thumbnail is displayed apart from its respective content data on the display means, the less similar the particular thumbnail is with respect to its respective content data.

8. A non-transitory computer readable medium storing a content search program configured to search for similar content data, the content search program causing a computer to comprise:

content data storage means for storing a plurality of pieces of content data in association with respective content identifiers in a storage device, each of the plurality of pieces of content data including at least one known feature type selected from a group of feature types including an image feature, an acoustic feature and a semantic feature, at least one piece of content data including feature types;

feature quantity computing means for computing, for each piece of the content data stored in the content identifier data storage unit, a known feature quantity corresponding to a known feature type included in a target piece of the content data, associating, as associated data sets for each piece of the content data, a content identifier of the target piece of the content data, the known feature type of the target piece of the content data, and the computed known feature quantity to each other, and storing the associated data sets in the storage device as feature quantity data;

unknown feature quantity computing means for computing a vector space from the feature quantity data, computing, for each piece of the content data, an unknown feature quantity corresponding to an unknown feature type based on correlations between (i) the known feature quantity corresponding to the known feature type included in the target piece of the content data and (ii) the computed vector space, the unknown feature type being different from the known feature type included in the target piece of the content data, and associating, for each piece of the content data, the content identifier of the target piece of the content data, the unknown feature type, and the computed unknown feature quantity to update the feature quantity data;

distance computing means for computing a distance indicating a similarity between each two pieces of the content data based on the known feature quantities and the unknown feature quantities stored in the feature quantity data;

display means for determining a display position of a thumbnail for each piece of the content data based on the distances computed by the distance computing means, and for displaying the thumbnail on a display device; and determining means for determining which, if any, of the content data stored in the content data storage means does not have each of an image feature, an acoustic feature and a semantic feature stored therewith in the content data storage unit, and wherein the unknown feature quantity computing means computes respective unknown feature quantities for each of the content data stored in the content data storage means that do not have an image feature, an acoustic feature and a semantic feature stored therewith in the content data storage means.

9. The non-transitory computer readable medium according to claim 8, wherein the unknown feature quantity computing means computes vector space including the known feature quantities for each of the known feature types of pieces of the content data in the content data storage means.

10. The non-transitory computer readable medium according to claim 8, wherein the unknown feature quantity computing means:

computes vector spaces corresponding to each of the feature types, computes correlations between two vector spaces corresponding to two feature types selected from the group of feature types, and computes the unknown feature quantity in the target piece of the content data based on: (i) the known feature quantity in the target piece of the content data, (ii) the vector space corresponding to the known feature type of the target piece of the content data, and (iii) the correlation between the vector space corresponding to the unknown feature type in the target piece of the content data and the vector space corresponding to the known feature type in the target piece of the content data.

11. The non-transitory computer readable medium according to claim 8, wherein in computing the feature quantity of the acoustic feature, the feature quantity computing means specifies a melody appearing repeatedly in an acoustic signal and defines a feature quantity of the repeated melody as the feature quantity of the acoustic feature.

12. The non-transitory computer readable medium according to claim 8, further causing the computer to execute:

important user determining means for, for user preference data, stored in the storage device, in which an identifier of a user is associated with a content identifier matching preference of the user, creating a set of the user identifiers associated with a piece of the content for each of the content identifiers, for creating a directed edge between the users in each set, and for determining an important user representing each set, wherein the distance computing means extracts the content identifier from the user preference data associated with the user identifier of the important user, and computes a distance indicating a similarity between the respective content data based on the known feature quantities and the unknown feature quantities corresponding to the extracted content identifier.

13. The non-transitory computer readable medium according to claim 12, wherein the display means further extracts a plurality of user identifiers associated with a certain content from the user preference data, and displays a user network on the display device, the user network including nodes respectively representing the identifiers of the plurality of users, and links between the nodes with consideration given to directed edges between the users.

14. The non-transitory computer readable medium according to claim 8, wherein the display means determines a display position of a plurality of thumbnails corresponding to other content data for each piece of the content data based on the distances computed by the distance computing means, and displays each thumbnail on the display means as a particular distance from the content data associated with each thumbnail, such that the further a particular thumbnail is displayed apart from its respective content data on the display means, the less similar the particular thumbnail is with respect to its respective content data.

15. A content search device configured to search for similar content data, comprising:

a content data storage unit configured to store a plurality of pieces of content data in association with respective content identifiers in a storage device, each of the plurality of pieces of content data including at least one known feature type selected from a group of feature types including an image feature, an acoustic feature and a semantic feature, at least one piece of content data including feature types;

a feature quantity computing unit configured to compute, for each piece of the content data stored in the content data storage unit, a known feature corresponding to a known feature type included in a target piece of the content data, the feature quantity computing unit configured to associate, for each piece of the content data, a content identifier of the target piece of the content data, the known feature type of the target piece of the content data, and the computed known feature quantity to each other, and the feature quantity computing unit configured to store, in the storage device, the associated data sets as feature quantity data;

an unknown feature quantity computing unit configured to compute a vector space from the feature quantity data, to compute, for each piece of the content data, an unknown feature quantity corresponding to an unknown feature type based on correlations between (i) the known feature quantity corresponding to the known feature type included in the target piece of the content data and (ii) the computed vector space, the unknown feature type being different from the known feature type included in the target piece of the content data, and to associate, as associated data sets for each piece of the content data, the unknown feature type, and the computed unknown feature quantity to update the feature quantity data;

a distance computing unit configured to compute a distance indicating a similarity between each two pieces of the content data based on the known feature quantities and the unknown feature quantities stored in the feature quantity data;

a display unit configured to determine a display position of a thumbnail for each piece of the content data based on the distances computed by the distance computing unit, and to display the thumbnail on a display device; and a determining unit for determining which, if any, of the content data stored in the content data storage unit does not have each of an image feature, an acoustic feature and a semantic feature stored therewith in the content data storage unit, and wherein the unknown feature quantity computing unit computes respective unknown feature quantities for each of the content data stored in the content data storage unit that do not have an image feature, an acoustic feature and a semantic feature stored therewith in the content data storage unit.

16. The content search device according to claim 15, wherein
the unknown feature quantity computing unit is configured to compute vector space including the known feature quantities for each of the known feature types of pieces of the content data in the content data storage unit.

17. The content search device according to claim 15, wherein
the unknown feature quantity computing unit is configured to:
compute vector spaces corresponding to each of the feature types,
compute correlations between two vector spaces corresponding to two feature types selected from the group of feature types, and
compute the unknown feature quantity in the target piece of the content data based on: (i) the known feature quantity in the target piece of the content data, (ii) the vector space corresponding to the known feature type of the target piece of the content data, and (iii) the correlation between the vector space corresponding to the unknown feature type in the target piece of the content data and the vector space corresponding to the known feature type in the target piece of the content data.

18. The content search device according to claim 15, wherein
in computing the feature quantity of the acoustic feature, the feature quantity computing unit specifies a melody appearing repeatedly in an acoustic signal and defines a feature quantity of the repeated melody as the feature quantity of the acoustic feature.

19. The content search device according to claim 15, further comprising:
a user preference data storage unit configured to store user preference data in the storage device, the user preference data being data in which an identifier of a user is associated with a content identifier matching preference of the user; and
an important user determining unit configured to create a set of the user identifiers associated with the content of each of the content identifiers in the user preference data, to create a directed edge between the users in each set, and to determine an important user representing each set, wherein
the distance computing unit is configured to extract the content identifiers from the user preference data associated with the user identifier of the important user, and to compute a distance indicating a similarity between each two pieces of the content data based on the known feature quantities and the unknown feature quantities corresponding to the extracted content identifiers.

20. The content search device according to claim 19, wherein
the display unit is configured to further extract a plurality of user identifiers associated with a certain content from the user preference data, and to display a user network on the display device, the user network including nodes as the respective identifiers of the plurality of users, and links between the nodes with consideration given to directed edges between the users.

21. The content search device according to claim 15, wherein the display unit determines a display position of a plurality of thumbnails corresponding to other content data for each piece of the content data based on the distances computed by the distance computing unit, and displays each thumbnail on the display device as a particular distance from the content data associated with each thumbnail, such that the further a particular thumbnail is displayed apart from its respective content data on the display unit, the less similar the particular thumbnail is with respect to its respective content data.

* * * * *